United States Patent [19]
Aras et al.

[11] Patent Number: 5,757,417
[45] Date of Patent: May 26, 1998

[54] METHOD AND APPARATUS FOR SCREENING AUDIO-VISUAL MATERIALS PRESENTED TO A SUBSCRIBER

[75] Inventors: Caglan M. Aras; Luther B. Griffin; Fuyung Lai; Arthur James Stagg, all of Raleigh; Kian-Bon Kho Sy, Cary, all of N.C.

[73] Assignee: International Business Machines Corporation, Armonk, N.Y.

[21] Appl. No.: 935,995

[22] Filed: Sep. 23, 1997

Related U.S. Application Data

[63] Continuation of Ser. No. 568,166, Dec. 6, 1995, abandoned.
[51] Int. Cl.$^6$ .................................................. H04N 7/14
[52] U.S. Cl. .................... 348/10; 348/1; 348/7; 348/569
[58] Field of Search ............................ 348/1, 10, 7, 569, 348/906, 563, 6, 12, 13, 5.5; 455/4.2; 380/10, 20

[56] References Cited

U.S. PATENT DOCUMENTS

| | | | |
|---|---|---|---|
| 4,536,791 | 8/1985 | Campbell et al. | 358/122 |
| 4,554,584 | 11/1985 | Elam et al. | 358/165 |
| 4,685,131 | 8/1987 | Horne | 380/20 |
| 4,750,213 | 6/1988 | Novak | 455/67 |
| 4,930,160 | 5/1990 | Vogel | 380/23 |
| 5,151,782 | 9/1992 | Ferraro | 358/86 |
| 5,173,900 | 12/1992 | Miller et al. | 370/110.1 |
| 5,195,135 | 3/1993 | Palmer | 380/20 |
| 5,208,745 | 5/1993 | Quentin et al. | 364/188 |
| 5,270,822 | 12/1993 | Choi | 358/188 |
| 5,319,705 | 6/1994 | Halter et al. | 380/4 |
| 5,410,344 | 4/1995 | Graves | 348/1 |
| 5,485,518 | 1/1996 | Hunter et al. | 380/20 |
| 5,550,575 | 8/1996 | West | 348/5.5 |
| 5,583,576 | 12/1996 | Perlman et al. | 348/460 |
| 5,598,276 | 1/1997 | Cookson et al. | 386/46 |

FOREIGN PATENT DOCUMENTS

| | | |
|---|---|---|
| 2209417 | 10/1989 | United Kingdom . |
| 9512275 | 5/1995 | WIPO . |
| 9515658 | 6/1995 | WIPO . |
| 9625821 | 8/1996 | WIPO . |

OTHER PUBLICATIONS

European Search Report.

*Primary Examiner*—Victor R. Kostak
*Attorney, Agent, or Firm*—John D. Flynn

[57] ABSTRACT

A method and apparatus for the automatic access control to multimedia presentations at the receiver in accordance with a viewer selected access mode and access classification data encoded into the multimedia presentation. Screening classification codes (SCCs) are embedded in the Audio Visual Material (AVM) delivered to a subscribers home station. The screening classification codes identify the type of content that follows in the AVM stream. For instance, violent content (video and/or audio) provided to a home station may contain a SCC that indicates violent scenes or violent action is forth coming in the AVM stream. The home station takes the SCC that are encoded and/or embedded in the AVM stream and applies a subscriber selected screening criteria. The screening criteria or suppression criteria are AVM manipulation commands. These AVM manipulation commands can blank the audio and/or video, cause the display of the last acceptable frame, perform obscuration transforms on the AVM stream or otherwise manipulate the audio and/or video portions of the AVM stream. The subscriber associates an AVM manipulation command with each of the available SCCs. The home station applies the subscriber desired manipulation commands to the AVM stream. Information on the subscriber selections are provided to an upstream node for subscriber behavior collection analysis.

15 Claims, 29 Drawing Sheets

FIG. 3

| NAME | FUNCTION | RANGE |
|---|---|---|
| AVI.STATE | INDICATES ARRIVAL OF AVI RECORD IN CURRENT AVI PERIOD. | NO_AVI, NEW_AVI, CHANGED_AVI, SAME_AVI. |
| AVI.TIMER | COUNTDOWN TIMER FOR AVI RECORD ARRIVALS. | $0...T_{AVI}$ |

FIG. 5

| NAME | FUNCTION | RANGE |
|---|---|---|
| AVI.STATE | ARRIVAL OF AVI RECORD IN CURRENT AVI PERIOD. | NO_AVI, NEW_AVI, CHANGED_AVI, SAME_AVI |
| AVI.TIMER | COUNTDOWN TIMER FOR AVI RECORD ARRIVALS | 0...T AVI |
| SURF.STATE | SUBSCRIBER CHANNEL-SURFING INDICATOR | SURF, WATCH |
| SURF.TIMER | TIMER TO DETECT USER CHANNEL SURFING | 0...T SURF |

FIG. 7

| 601 | 603 | 605 | 613 |
|---|---|---|---|
| AVI | START INDEX | LAST INDEX | AVM MANIPULATION |
| 343-567-231 | 12 | 18 | BLANKING |
| 565-778-543 | 967 | 1200 | NO SUPPRESSION |
| — | — | — | |

FIG. 10

| 601 | 603 | 605 | 607 | 613 |
|---|---|---|---|---|
| AVI | START INDEX | LAST INDEX | SURFED | AVM MANIPULATION |
| 343-567-231 | 12 | 18 | 1 | S TRANSFORM |
| 565-778-543 | 967 | 1200 | 0 | NO SUPPRESSION |
| 789-446-553 | 121 | 160 | 0 | NO SUPPRESSION |

FIG. 11

| 601 | 603 | 609 | 611 | 613 |
|---|---|---|---|---|
| AVI | START INDEX | START TIME | END TIME | AVM MANIPULATION |
| 343-567-231 | 12 | 13:18:53 | 13:25:00 | S TRANSFORM |
| 565-778-543 | 967 | 13:26:01 | 16:37:41 | NO SUPPRESSION |
| — | — | — | — | |

FIG. 12

| 1401 | 1403 | 1405 | 1407 | 1409 |
|---|---|---|---|---|
| HOME STATION ID. NUMBER | SUBSCRIBER NUMBER | TIME STAMP | BEHAVIOR COLLECTION TABLE | SCT |

FIG. 14

METHOD AND APPARATUS FOR SCREENING AUDIO-VISUAL MATERIALS PRESENTED TO A SUBSCRIBER

This is a continuation of application Ser. No. 08/568,166 filed on Dec. 6, 1995, now abandoned.

BACKGROUND OF THE INVENTION

RELATED APPLICATIONS

The present invention relates to "A METHOD AND APPARATUS FOR MONITORING AUDIO-VISUAL MATERIALS PRESENTED TO A SUBSCRIBER" assigned to the same assignee as the present invention herein incorporated by reference.

1. Field of the Invention

The present invention relates to a method and apparatus for permitting a subscriber to control the presentation of audio-visual materials received at a home station. More particularly, it relates to a method and apparatus involving screening classification codes embedded in audio visual materials, and a software system residing in the home station to screen the audio-visual materials in accordance with subscriber suppression criteria.

2. Description of the Prior Art

Censorship of audio-video material is an accepted means for preventing access to violent or pornographic material by minors or sensitive adults. Such censorship may take the form of a movie rating system for controlling access to theaters, broadcast reception blocking receiver decoders or parental advisories preceding a broadcast and other similar methods. In some cases viewers censor themselves, taking discretionary action such as closing their eyes or avoiding movies or video broadcasts all together to avoid the discomfort of seeing or hearing objectionable program material. Audio-video programming vendors are obliged to carefully balance the moral convictions of some viewers with the aesthetics of others. Various segments of society find offense in different subject matters, such as adult situations, nudity/sex, violence and distasteful language. One viewer may object to a simple kiss on the screen but find bloody mayhem entertaining and another may be offended by a simple blow to the nose while easily tolerating full frontal nudity. Satisfying the general social aesthetic without muting the artistic and entertainment value of audio-video programming requires a very delicate and difficult balancing act.

Cinema production companies, wishing to attract as large an audience as possible, may choose to script and produce cinema productions with R-ratings, knowing that large minority segments of the population will be dissuaded from viewing such an R-rated film. In fact, the display of R- and X-rated movies is often restricted by local zoning ordinances, which results in undesired restrictions on the audience size for the non-objectionable portions of such cinema productions as well as the objectionable material.

Practitioners in the art have long been aware of the difficult problems presented by variations in taste and artistic sentiment in the general population and the effect of these problems on the distribution of audio-video programming. There is a long felt need in the art for a reliable and useful means for automatic censorship of audio-video programming material according to a set of preselected classifications. The censorship methods known in the art generally suffer from a number of unresolved deficiencies.

For instance, a censorship system for an entire audio-video program fails to reflect the censorship required to please a variety of individual tastes when showing any audio-video programming material. For example, many people would prefer a movie having an R-rating with respect to sexual content, but also desire a G-rating with respect to violence or language content. At any particular point in an audio-video program, the sexual content, the violence content, language content and adult situation content may be classified at different levels. A single rating that reflects the highest level of classification throughout the entire program unjustly and inappropriately over classifies the preponderance of the audio-video program material that might be enjoyed by even the most sensitive viewer. Accordingly, there is a strongly-felt need in the art for an automatic censorship method applicable to audio-video programming that will permit the viewer to select a mode of censorship that includes a preferred level of censorship for a variety of different subjects, thereby permitting the viewer to enjoy any audio-video programming with the uniquely offensive portions discretely obscured from viewing and hearing.

Furthermore, any censorship system must be capable of handling attempts to circumvent the censorship. Thus, a child should not be able to "channel surf" to avoid censorship or to view portions of the audio-video program materials that the child's parents have selected to be censored.

There is also a need for the producers of audio-video programming to determine which portions of the programming are being presented and what portions are being selected for obscuration. This can be very important in planning and developing plots so that viewers who are utilizing a censoring system are still informed as to what is happening with the plot.

These unresolved problems and deficiencies are clearly felt in the art and are solved by the invention in the manner described below.

SUMMARY OF THE INVENTION

The above-mentioned needs have been met in accordance with the present invention by providing for screening of audio-visual materials (AVMs) received at a home station in accordance with a set of AVM manipulation commands input by a subscriber. The present invention utilizes screening classification codes (SCCs) in the AVMs delivered to a subscribers home station. The screening classification codes identify the type of content that follows in the AVM stream. For instance, violent content (video and/or audio) provided to a home station may contain a SCC that indicates violent scenes or violent action is forth coming in the stream. The SCCs can support a wide variety of classification schemes. The present invention takes the SCCs that are encoded and/or embedded in the AVM stream and applies a subscriber selected screening criteria. The screening criteria or suppression criteria are AVM manipulation commands. These AVM manipulation commands can manipulate the audio and/or video portions of the AVM stream. AVM manipulation commands can blank the audio and/or video, cause the display of the last acceptable frame, perform obscuration transforms on the AVM stream or otherwise manipulate the audio and/or video portions of the AVM stream. The subscriber associates an AVM manipulation command with each of the available SCCs. The home station applies the subscriber desired manipulation commands to the AVM stream. Information on the subscriber selections are provided to an upstream node for subscriber behavior collection analysis. The AVM manipulation applied, based on the subscriber's selection, may be stored and sent back as part of an extended behavior collection table (BCT) or may be sent back as a separate table. The home station provides information on what AVMs are presented to the subscriber and what, if any, manipulation of the AVM is performed.

The home station also provides protection against channel surfing to circumvent the screening system while permitting presentation of AVMs during channel surfing. When the subscriber changes channels a new SCC may not be immediately available on the newly selected channel. Instead of blanking or blocking the presentation of AVM in the newly selected channel until a SCC is received, the home station consults a channel classification table (CCT) to obtain a general category rating for the channel. Based on the general category rating the home station applies an AVM manipulation command that the subscriber has associated with the general category rating. Thus, a subscriber cannot channel surf around the suppression criteria by quickly changing channels, and potentially more acceptable AVM can be presented to the viewer than with complete blanking of the AVM stream. The use of a CCT permits the sending of SCCs only when the content of the AVM changes thus conserving bandwidth in the return channel path. Until an SCC is received the home station applies a coarser level of screening provided by the CCT which enables the sending of SCC, only when the AVM content dictates, rather than periodically.

It is an object of the invention to provide a method and apparatus that links presentation of Audio-Visual Materials with screening classification codes associated with portions of the Audio-Visual Materials.

It is an object of the invention to provide a censorship system for AVMs that allows a subscriber to easily specify what audio-visual material content to screen.

It is another object of the invention to provide a screening mechanism that provides for screening when subscribers are channel surfing.

It is a further object of the invention to provide for collection on how subscribers are screening AVMs presented on their home stations.

It is yet another object of the invention to prevent viewers from channel surfing around selected AVM manipulation commands.

It is an object of the invention to provide accurate information on how subscribers are screening AVMs on their home stations.

BRIEF DESCRIPTION OF THE DRAWINGS

The foregoing and other objects, aspects and advantages of the invention will be better understood from the following detailed description with reference to the drawings, in which:

FIG. 5 provides a table of variables for behavior collection.

FIG. 7 provides a table of variable for behavior collection using a surfing filter.

FIG. 10 shows one embodiment of a behavior capture table including the Audio Visual Identifier, Start Index, Last Index, AVM manipulation command.

FIG. 11 shows an embodiment of a behavior capture table including the Audio Visual Identifier, Start Index, Last Index and Surf Bit, AVM manipulation commands.

FIG. 12 shows an alternative embodiment of a behavior capture table including the Audio Visual Identifier, Start Index, Start Time, end Time, AVM manipulation command.

FIG. 14 provides a logical view of the data to be provided to the behavior collection information center.

DETAILED DESCRIPTION

Figure 1:
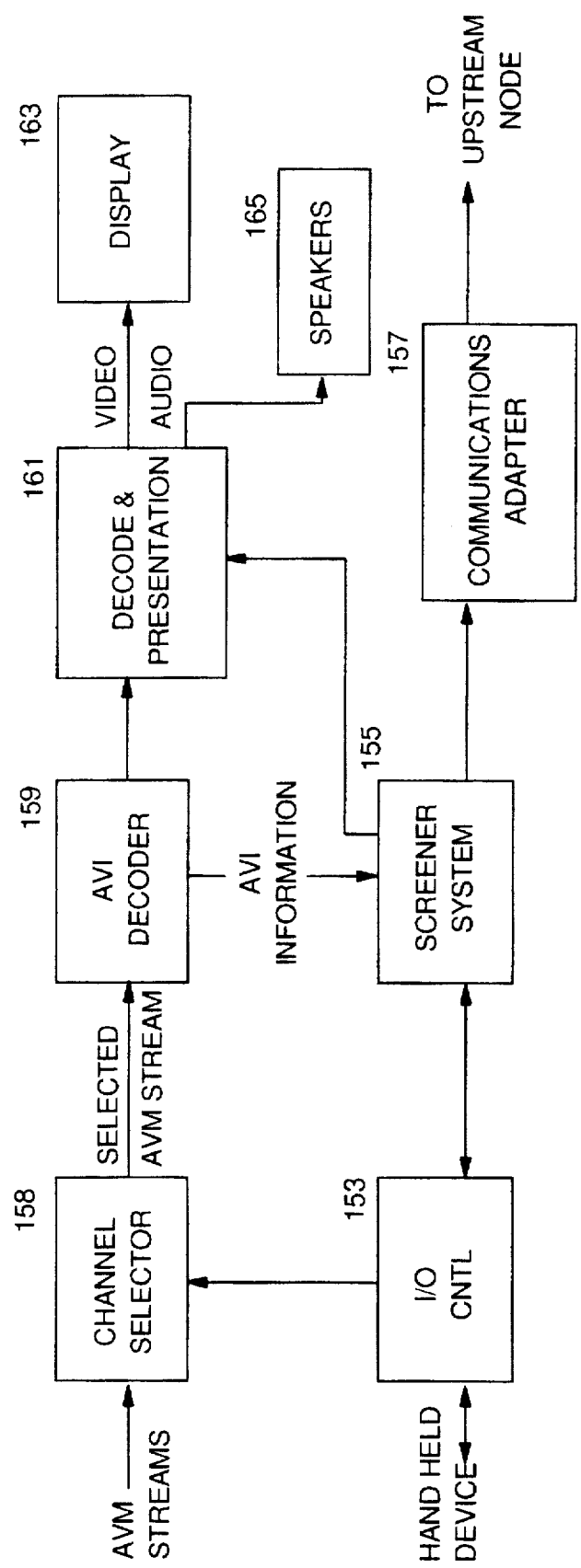
FIG. 1 is an overview of home station.

The home station is the subscriber access point to an interactive multimedia network. The home station is supplied with a plurality of audio-visual materials (AVMs) from one or more service providers. The home station contains a receiver to receive and present the audio-visual materials provided by the service provider complex (i.e., the cable head end, the AVM server, Broadcast Server or AVM Distribution Node). The home station receives analog or digital audio or video signals through one or more analog or digital AVM distribution and broadcast networks. The home station permits the subscriber to control the presentation of AVMs. The home station may also provide the subscriber with an interactive capability. The interactive capability allows the subscriber to select AVMs for presentation as well as participate interactively in AVM presentations such as games-on-demand or video-on-demand. The home station has the ability to provide information to an upstream node (i.e., an AVM distribution node or behavior collection center). The home station thus has an up-link communications capability or a so-called "reverse channel".

The present invention utilizes screening classification codes (SCCs) in the AVMs delivered to a subscriber's home station. The screening classification codes identify the type of content that follows in the AVM stream. For instance, violent content (video and/or audio) provided to a home station may contain an SCC that indicates violent scenes or violent action is forth coming in the AVM stream. The SCCs can provide a wide variety of classification schemes. The present invention takes the SCC that are encoded and/or embedded in the AVM stream and applies a subscriber selected screening criteria. The screening criteria or suppression criteria are AVM manipulation commands. These AVM manipulation commands can manipulate the audio and/or video portions of the AVM stream. AVM manipulation commands can blank the audio and/or video, cause the display of the last acceptable frame, perform obscuration transforms on the AVM stream or otherwise manipulate the audio and/or video portions of the AVM stream. The subscriber associates an AVM manipulation command with each of the available SCCs. The home station applies the subscriber desired manipulation commands to the AVM stream. Information on the subscriber selections are provided to an upstream node for subscriber behavior collection analysis. The AVM manipulation applied, based on the subscriber's selection, may be stored and sent back as part of an extended behavior collection table (BCT) or may be sent back as a separate table. The home station provides information on what AVMs are presented to the subscriber and what, if any, manipulation of the AVM is performed.

The home station also provides protection against channel surfing to circumvent the screening system while permitting presentation of AVMs during channel surfing. When the subscriber changes channels a new SCC may not be immediately available on the newly selected channel. Instead of blanking or blocking the presentation of AVM in the newly selected channel until a SCC is received, the home station consults a channel classification table (CCT) to obtain a general category rating for the channel. Based on the general category rating the home station applies an AVM manipulation command that the subscriber has associated with the general category rating. Thus, a subscriber cannot channel surf around the suppression criteria by quickly changing channels, and potentially more acceptable AVM can be presented to the viewer than with complete blanking of the AVM stream. The use of a CCT permits the sending of SCCs only when the content of the AVM changes thus conserving bandwidth on the data channel between the home station and the BCC. Until an SCC is received the home station applies a coarser level of screening provided by the CCT which enables the sending of SCCs only when the AVM content dictates, rather than periodically.

A functional overview of a home station is shown in FIG. 1. The home station may be embodied in a set-top terminal connected to a television set or a personal computer or a personal computer connected to a television set or a television set equipped with appropriate electronics. The home station may be a digital and/or analog receiver equipped to decode and present AVMs, or a PC, or an adapter card designed for use in a PC in conjunction with a TV. The AVMs may be presented to the subscriber on a PC screen, picture tube, projection device, TV screen or any other display device 163. The audio portion, is presented to the subscriber using speakers 165. If the AVMs is audio only, (i.e., cable radio) then only the speakers 165 are required. The home station may exist in various forms. In a cable television environment, a set-top may act as the home station. A PC may also be used as a home station by connecting it to digital broadcast networks over cable or through other data broadcast network implementations such as over satellite, traditional LANs etc. The home station functions may also be integrated into a TV set. If a picture-in-picture is used, the home station may treat each picture separately.

The subscriber selects from one or more AVM streams using some form of I/O device. Typically the subscriber uses a remote control device, although a standard keyboard or PDA or other device may be utilized. The subscriber may input information to the home station via the hand-held device. The hand-held device may be a simple remote control device as is associated with most settops and TVs or in more sophisticated systems a PDA. The hand held device communicates with the base unit of the home station via infra-red or radio frequency or cable link. The subscriber's input is handled by the I/O controller 153 and is provided to the screener system 155. The screener system 155 may provide a channel selection function or the channel selection function may be performed by a channel selector 158 connected to the I/O controller 153 as shown in FIG. 1. Note that the channel selector functions as a tuner to tune to the home station to the channel selected by the subscriber. Typically the tuner receives many channels from which the subscriber selects one for presentation. After the channel selection function only one channel is output. The selected channel is provided to an AVI decoder 159. The AVI decoder 159 extracts AVI information from the selected AVM stream and provides the AVI information to the screener system 155. The screener system 155 is coupled to the decode and presentation function 161. The screener system 155 can cause modification of the AVM to be presented to the subscriber. This may entail injecting messages for the subscriber or modifying the AVM such as transforming the audio and/or video portions in accordance with the subscriber selected screening criteria. These other functions enable the screener system 155 to manipulate or modify the selected AVM stream. Thus, blanking sound or video or transforming or distorting the video and audio portions of the selected AVM stream can be accomplished under the control of the screener system. In order to carry out some of the AVM manipulation functions the decode and presentation function may have additional elements for buffering, capturing, grabbing, converting and manipulating the presentation of AVMs. The screener system may also contain elements for aiding in the manipulation of the selected AVM. Actual features of the decode and presentation function 161 will depend on desired capabilities and cost considerations. Decoding in the decoding and presentation function 161 will depend on the physical signal format of the selected AVM stream.

The screener system 155 can communicate with an upstream node using the communications adapter 157. The communications adapter 157 may be a cable modem or other device for communicating with the upstream node. The communication adapter 157 adapts upstream messages to the particular communications medium utilized for upstream traffic.

Figure 2:
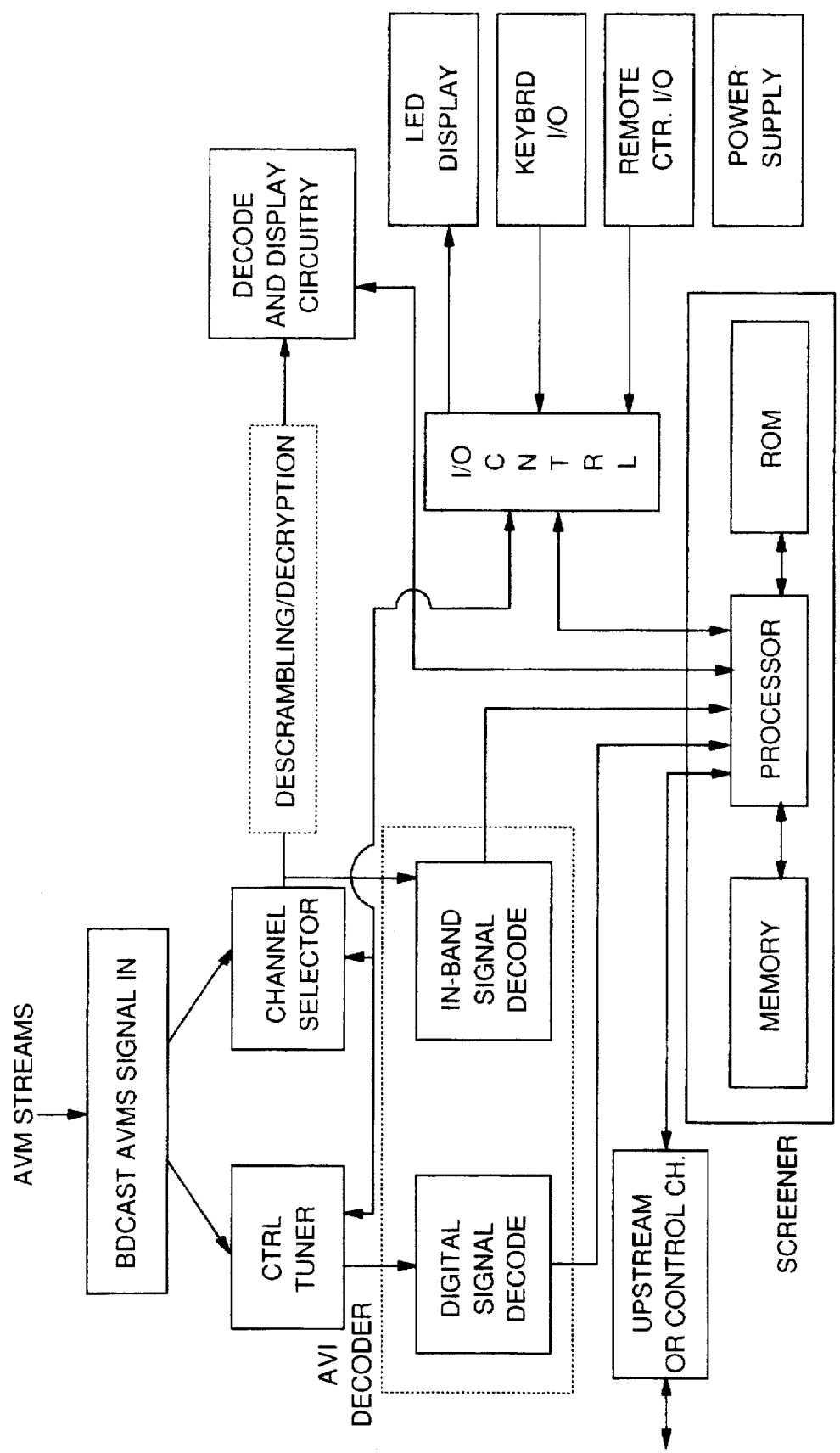
FIG. 2 a detailed view of a home station.

FIG. 2 shows a more detailed look at one embodiment of a home station. The home station has the following basic features: broadcast signal reception (analog or digital or both), AVI decode (i.e., out-of-band or in-band digital signal reception), up-stream transmission capability (to send the collected information back to the up stream node), a subscriber channel selection capability, a processor with a software system and memory to perform the screener functions. In FIG. 2 the AVI decoder is separated into an in-band signal decoder for extracting AVI information from the AVMs that are sent with the AVM such as using the vertical blanking interval for AVI information. When a set-top terminal is used as a home station, analog or digital television and audio signals will carry the AVI. In the analog case, the AVI may be embedded into the vertical blanking interval (VBI) of the video signal, similar to the embedding of closed captions. In this case, the data will flow through the channel selector, into the in-band signal decoder, then into the processor, where the screener system will process the AVI. For digital video broadcasts, after the channel selector, the AVI information will be filtered by the in-band signal decoder then sent to the screener system. For digital audio broadcasts, the same mechanism will apply. FIG. 2 also depicts the use of descrambling and decryption that may be found in some systems. Note that the AVI decoder might be placed after the descrambler and decrytper depending on the particular AVI encoding mechanism utilized. FIG. 2 also depicts a wide variety of subscriber input devices. The subscriber may input information with a keyboard, with a remote, and/or a touch display and receive information on the display. The CCT information may be sent through a single channel dedicated to data transmission concerning all channels. Such an out-of-band channel can be a modulated data carrier in the FM band.

In FIG. 2, the screener system is shown as a processor, memory and ROM. The preferred embodiment of the screener system is one or more software systems. It should be understood that the present invention contains one or more software systems. In this context, a software system is a collection of one or more executable software programs, and one or more storage areas ( for example, RAM, ROM, cache, disk, flash memory, PCMCIA, CD-ROM, server's memory, etc.) In general terms, a software system should be understood to comprise a fully functional software embodiment of a function or collection of functions, which can be added to an existing computer system or home station to provide new function to that computer system or home station. Software systems generally are constructed in a layered fashion. In a layered system, a lowest level software system is usually the operating system which enables the hardware to execute software instructions. Additional layers of software systems may provide, for example, database or graphical user interface or window management system capabilities. These software systems provide a foundation on which additional software systems can be built. A software system is thus understood to be a software implementation of a function which can be assembled in a computer system or home station providing new functionality. Also, in general, the interface provided by one software system to another software system is well-defined. It should be understood in the context of the present invention that delineations between software systems are representative of the preferred implementation. However, the present invention may be implemented using any combination or separation of software or hardware systems. It is important to note that while the present invention is described in the context of a fully functional home station or computer system, those skilled in the art will appreciate that the present invention is capable of being distributed as a program product via a floppy disk, CD ROM, or other form of recordable media or via any type of electronic transmission mechanism such as the INTERNET.

Figure 3:
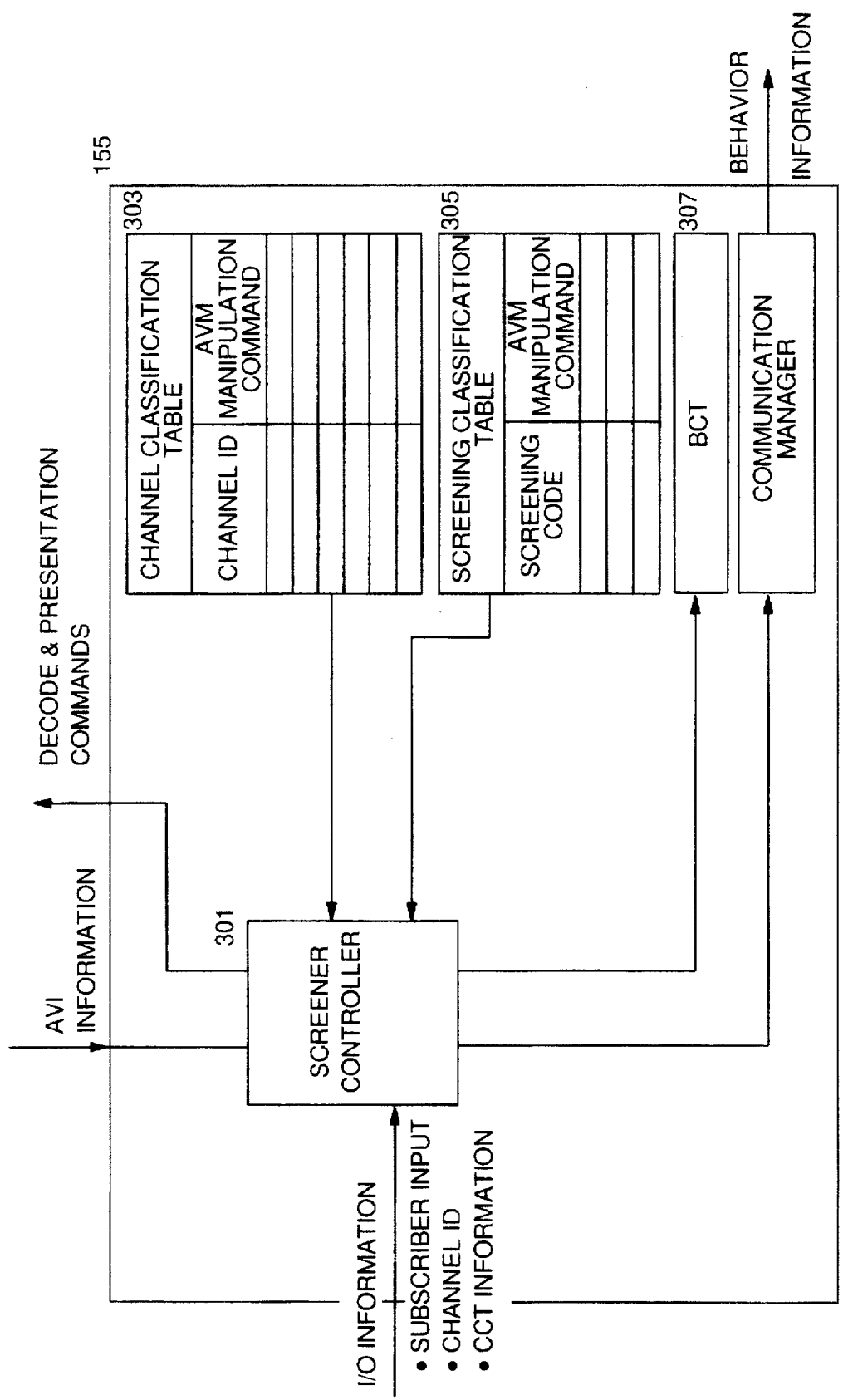
FIG. 3 a functional overview of the screener system.

A functional overview of a screener system is shown in FIG. 3. The screener controller 301 is an event driven process that responds to events that are generated by the subscriber, the AVMs, or the hardware and software systems.

The screener controller 301 receives AVI information, including SCCs from the AVI decoder. The screener controller 301 stores AVI information, and in some embodiments AVM manipulation commands, in the behavior collection table (BCT) 307. The screener controller 301 accesses the channel classification table CCT 303 and the screening classification table SCT 305 to determine which AVM manipulation commands to apply to the selected AVM stream. The CCT 303 provides a coarser level of suppression then the SCT 305. The CCT 303 is utilized to apply an AVM manipulation command to the selected AVM stream on a selected channel when there are no SCCs available on the channel or until SCCs are received on the selected channel. The SCT provides a finer level of suppression and is used when SCC information is present in the selected AVM stream. The use of CCT prevents the need for blocking the presentation of AVMs on channels that have no AVI information or screening classification codes in the AVM stream. This results in more acceptable material being presented to a subscriber.

The SCT is built using information input by the authorized subscriber. The authorized subscriber is the individual responsible for deciding what type of content is acceptable for presentation within the household. The authorized subscriber associates AVM manipulation commands with the SCCs and overall channel ratings. The CCT may be built from information obtained from the AVM provider. For instance, most cable systems today provide a channel that provides program listing General classification information can be transmitted over the channel to build this CCT. CCT information may input by the subscriber and be logical organized as tables.

SCT DETAILED DESCRIPTION

The screener controller 301 utilizes screening classifications codes (SCCs) embedded and/or encoded in the selected AVM stream and the SCT 305 to determine what type of AVM manipulation to perform on the selected AVM stream. The SCCs and AVM manipulation commands are associated in the SCT 305. The subscriber associates the SCCs with AVM manipulation commands. The subscriber may be prompted for input to build the SCTs by a program that presents classification type and AVM manipulation command information to the subscriber on the display device. The permissible AVM manipulation commands will depend on the capabilities of the home station. For instance, the AVM manipulation command "freeze last acceptable Frame" may require the ability to grab and store a frame from the selected AVM stream, and present it continuously until a new AVM manipulation command is executed. This may require additional hardware such as a frame grabber. Authorized subscriber access to the SCT may entail the use of a Personal Identification Number (PIN) or other security feature to prevent unauthorized persons in the subscriber's household from changing the SCT.

The subscriber inputs information on what type of AVM content the subscriber desires suppression, screening or manipulation and the how the subscriber desires the manipulation to take place. For each classification the subscriber can associate a type of suppression or a type of screening. Table I depicts a set of classification types. The classification types shown in Table I are for illustrative purposes. Classification types may be more extensive or less extensive then the example shown in TABLE I. The classifications of content type must be associated with the screening criteria code encoded into the AVM stream containing the AVI information. The screener controller uses the classification codes embedded in the AVM stream to obtain the suppression criteria and apply the suppression criteria to the AVM stream. Note that the suppression criteria may entail no suppression, blanking, freezing the last acceptable frame, any of a number of video/audio transformations, presenting an image, or presenting an alternative AVM. Note that the classification type and suppression criteria as shown in Table I can be encoded differently in the home station.

TABLE I

SCREENING CRITERIA TABLE

| CLASSIFICATION TYPE | SUPPRESSION CRITERIA |
|---|---|
| NO violence, NO sex, NO improper language | No suppression |
| Violence | Freeze last acceptable frame |
| Sex | S Transform |
| Improper language | Mute Sound |
| Sex and improper language | Hadermard Transform, mute sound |
| Sex and violence | Display Image 'XYZ.wpg' |
| Violence and improper language | Freeze Last Acceptable frame, mute sound |
| Sex, violence and improper language | Blank Video, mute sound |

The SCT may also be enhanced to operate in conjunction with the CCT. The SCT may add general classifications and associated suppression criteria. Thus, the SCT shown in Table I can be expanded to include the following General Classifications: G, PG, PG-13, R, and NC-17 as is available from the Motion Picture Academy of America or some other general classification scheme. Alternatively, the suppression criteria in the CCT may contain a suitable classification type as provided in the SCT. For instance, instead of G an SCC of "No Sex, No Violence, No improper language" may be used. The CCT acts as a default in that when the AVM stream is unable to provide a SCC, a default SCC is obtained from the CCT. If the CCT contains appropriate default SCCs then additions to SCT shown in Table II are unnecessary, the screener controller uses the SCC obtained from the CCT to determine the AVM manipulation command from the SCT. Thus, the CCT provides a coarser level of screening control.

TABLE II

ADDITIONAL ROWS OF SCT

| CLASSIFICATION OF CONTENT TYPE | SUPPRESSION CRITERIA |
|---|---|
| General(G) | No Suppression |
| Parental Guidance (PG) | No Suppression |
| Parental Guidance (PG-13) | No Suppression |
| Restricted (R) | Blank |
| NC-17 | Blank |

CCT DETAILED DESCRIPTION

The CCT associates a general classification code with a channel. In the preferred embodiment, the CCT includes a time interval. The general classification code is associated with an AVM manipulation command that the subscriber has selected. The SCT provides the ability to associate general classification codes with AVM manipulation commands. Thus, when SCCs are not available or when a subscriber is channel surfing the general classification code is utilized to determine the appropriate suppression criteria. The CCT may be populated by the home station tuning to a particular channel periodically to obtain updated classification information for the CCT or when the home station is initialized. The CCT may also be created by the subscriber associating a general classification with each particular AVM provider or channel such NBC, ABC, CBS, TBS, FOX, etc. One embodiment of the CCT is shown in Table III below.

TABLE III

| CHANNEL | CCT GENERAL CLASSIFICATION CODE |
|---|---|
| 2 | G |
| 3 | G |
| 4 | PG |
| 5 | R |
| 6 | G |
| 7 | G |
| 8 | PG-13 |
| 9 | NC-17 |
| 10 | G |
| 11 | G |
| 12 | PG |
| 13 | G |
| 14 | G |
| 15 | G |
| 16 | PG-13 |
| 17 | PG |
| 18 | PG |
| 19 | PG |
| 20 | G |
| 21 | G |
| 22 | G |

To obtain the general classification from the CCT the screener controller requires a channel identifier. This can be obtained from the channel selector, the I/O controller or the AVM stream.

Note that CCT may include the appropriate SCC in the general classification code column. Thus, instead of the "G" rating the CCT may contain the SCC for "No sex, No violence, No improper language". The CCT may also include a time interval in which the general classification code is valid. This increases the size of the CCT but provides for a finer granularity in screening. To access the CCT the screener controller requires a channel identifier and the current time. The channel identifier can be obtained from the channel selector, the I/O controller or the AVM stream. The current time can be obtained from the system clock. A portion of the CCT with time interval is shown in Table IV.

TABLE IV

CCT WITH TIME INTERVAL

| CHANNEL | GENERAL CLASSIFICATION CODE | START TIME | STOP TIME |
|---|---|---|---|
| 2 | G | 12:00:00 | 12:30:00 |
| 2 | R | 12:30:00 | 13:00:00 |
| 2 | PG | 13:00:00 | 14:00:00 |

BCT DETAILED DESCRIPTION

Sample BCTs are shown in FIGS. 10–12. In FIG. 10, note that AVI identification number as shown in column 601 of the table and the start index in column 603 are derived from the AVI information embedded in the AVM provided to the home station and displayed on the home station's display. The start index 603 is the first time index that the home station receives for a particular AVM when the home station was presenting the AVM associated with the audio visual identifier 601 (or at least the time the AVI information was received on the channel to which the home station is tuned). The last index 605 is the last time index that the home station received while presenting the AVM. The AVM manipulation command applied between the start index 603 and last index 605 is captured in the AVM manipulation command column 613. The AVM manipulation command may be represented by a code to save space in the BCT. Each AVM with a separate AVI may have multiple entries in the BCT due to the screening or suppression of different portions or different AVM manipulation commands applied to different portions. Table V illustrates a portion of a sample BCT.

TABLE V

SAMPLE BCT

| AVI | Start Index | Last Index | AVM Manipulation |
|---|---|---|---|
| AC345-05C21 | 5 | 8 | Blanking |
| AC345-05C21 | 8 | 15 | No Suppression |
| AC345-05C21 | 15 | 35 | Freeze last acceptable Frame |

As shown in FIG. 12, in an alternative embodiment the start index 603 and last index 605 may be replaced with start time 609 and end time 611, respectively. In this alternative embodiment a time of day clock must be provided for in the home station so that when entries are to made into the behavior table the clock can be read and the time written to the behavior collection table.

Note also that in lieu of collecting the AVM manipulation applied to the selected stream in the BCT, the SCT may be sent back when the BCT is sent back or whenever the authorized subscriber makes changes to the SCT. The behavior collection node having knowledge of the SCC encoding of the AVM stream and the subscriber's SCT can determine which portions had which manipulation commands applied. The Home Station may also contain a feature that prevents collection of AVM manipulation. This feature may be used by the behavior collection center, in order to manage upstream bandwidth by turning the screening collection off. Screening collection results in the use of more upstream channel bandwidth because either the BCT is larger, if AVM manipulation is captured, or the SCT needs to be sent back.

The subscriber may also prevent collection of all information as well as only screened information by selecting screening privacy feature. Thus, the subscriber may turn screening collection off as well as all behavior collection.

SCREENING CLASSIFICATION ENCODING

Figure 13:
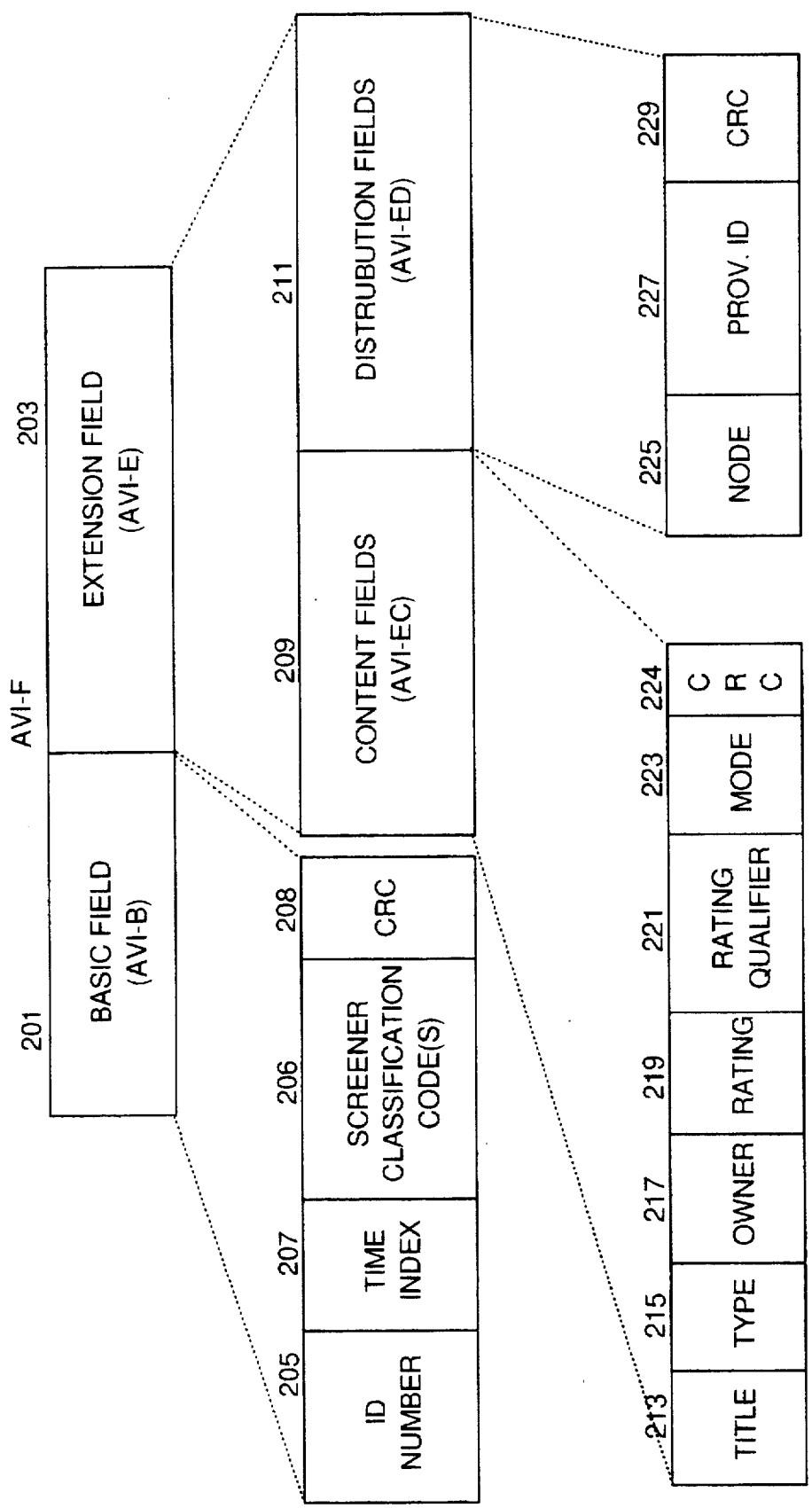
FIG. 13 provides a description of the AVI encoding.

The screener system allows a subscriber to control the type of AVM content presented on the subscriber's home station. The screener function may modify the presentation of unwanted elements from a AVM stream. The screener system is provided with certain AVI information fields that are extracted from the AVM selected by the subscriber for presentation. In addition to containing information that identifies the AVM, the AVI fields may contain screening classification codes (SCCs). FIG. 13 contains a description of the AVI information. Note that in the embodiment shown in FIG. 13, the SCCs are contained in the basic AVI field. The basic field can be sent whenever the classification type of the AVM stream is changed. If the basic field is sent periodically, the SCCs need only be included when the content changes.

One embodiment of SCCs classifies the AVM content into one of eight categories is shown in Table VI. The SCCs embedded in the AVM stream use 3 bits. This SCC scheme is used to describe the AVM content that follows. The SCC is provided when the content of the AVM stream changes with respect to the classification scheme or the categorization changes. It may be repeated every 'n' time intervals, where 'n' is a device specific value in order to provide a quicker SCC lockup time when a subscriber is channel surfing (i.e., reduce the amount of time when the general classification codes are used). The SCC is extracted from the selected AVM stream and provided to the screener system. Other embodiments are also available that may use more or less then the 3 bits and contain more or less categories.

TABLE VI

SCREENING CLASSIFICATION CODES

| SCC 'XXX' | DESCRIPTION |
|---|---|
| '000' | NO violence, NO sex and NO improper language |
| '001' | Violence |
| '010' | Sex |
| '011' | Improper language |
| '100' | Sex and improper language |
| '101' | Sex and violence |
| '110' | Violence and improper language |
| '111' | Sex, violence and improper language |

Note that the SCCs shown in TABLE VI, may be incorporated in the AVI-B field described in FIG. 13. Furthermore, the SCCs may also contain a time index in addition to the time index included in the AVI-B field shown in FIG. 13, that indicates the time when the AVM content described by the SCC starts. The SCC time index adds flexibility to the screener system.

It should be noted that the BCT, SCT and CCT are shown and described as logical tables. These tables may be physically stored in a variety of manners. Thus, the tables may be stored as a flat file or in database table or set of database tables or as objects or sets of objects in an object oriented database or as some other data structure. It should be noted that any method of storing and retrieving the information will work with the present invention.

AVM MANIPULATION

Based on the AVI fields provided to the screener function and information input by the subscriber the screener function may cause the AVMs presented to the subscriber to be modified or manipulated. The manipulation of the AVM may entail modifying the video portion, the audio portions or both video and audio portions. The extent of the modification will depend on the subscriber input preferences and the technical capabilities of the home station. The modification of the AVMs may take one of many forms. For instance in the case of the video manipulation the modification may be 1) obscuring the screened portions using an image transformation such as an S-Transform or Hadamard transform, or 2) freezing the last acceptable frame and presenting as a substitute for the screened portions, or 3) blanking the display, or 4) substituting an acceptable image or 5) presenting an alternative AVM stream. With respect to the audio portion of the AVMs, the modification may take the form of 1) replacement with music or some other audio source, or 2) replace audio with static or other noise or 3) the removal or blanking of all audio or 4) filtering of audio using some audio transformation. Some of the above modifications may require additional hardware to manipulate and modify the audio and video portions. Buffering of the video may be required for image transformations as well as hardware capable of performing the transformation in real-time. If the signal is analog signal then a D/A and A/D capability may be required. Displaying the last acceptable frame requires a frame grabbing capability which may require buffering. Displaying an acceptable image or frame requires that the image or frame be loaded and presented. The home station may contain multiple images that the subscriber can select from. If an alternative AVM stream is desired then it must be identified and supplied to the decode & presentation function.

In the preferred embodiment, the screener system determines what manipulation of the selected AVM stream is to occur and provides the AVM manipulation command or control signals to the decode and presentation function to carry-out the desired manipulation. The screener system may sequence the decode & presentation function commands and/or control signals to carry out the desired manipulation. In the preferred embodiment, the display & presentation function performs the manipulation command on the AVM stream until another AVM command is provided by the screener system. The screener system provides an AVM command to clear when no screening is required. Each AVM manipulation command may consist of one or more commands. For instance, freeze last acceptable frame may entail a command to grab a frame and a command to present the previously grabbed frame.

Figure 15A:
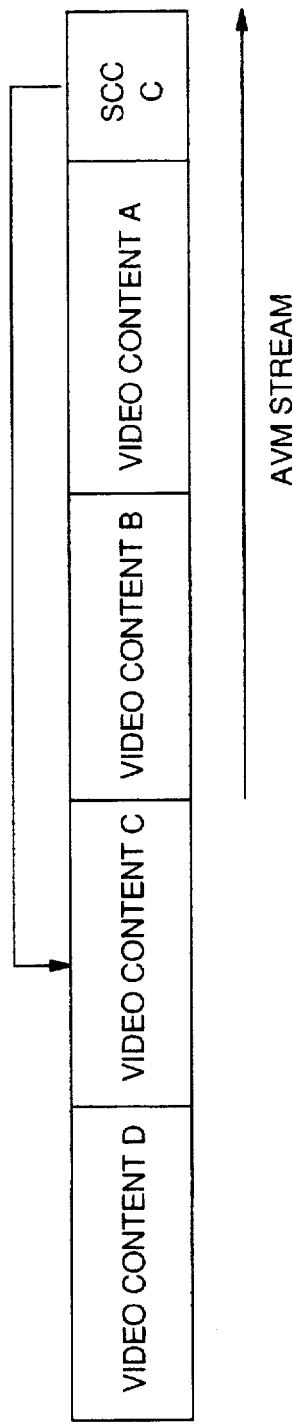
FIG. 15(a) provides a logical view of the timing between the SCCs and the AVM content classified.

The timing of the SCCs with respect to the portions of AVMs which are classified will now be discussed. FIG. 15 depicts the timing involved in the use of SCCs. Note that SCCs can provide for classification encoding for material to be provided to the home station. Thus, the SCC may be sent ahead of the content that is classified as is shown in FIG. 15(a). How far ahead is determined by the processing time for SCCs and the particular capabilities of the home station. The home station may need to grab or capture an acceptable frame, if required, and perform any preprocessing necessary to carry-out the appropriate suppression criteria. Thus, there needs to be enough time to allow the screener system to process and for the decode & presentation function to respond to the screener system commands.

Figure 15B:
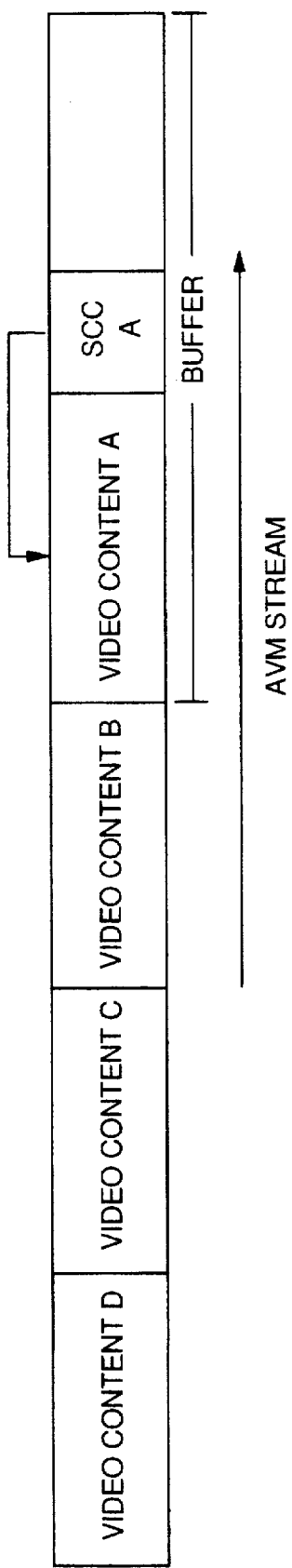
FIG. 15(b) provides a logical view of the timing between the SCCs and the AVM content classified when buffering is utilized.

As alternative to sending the SCCs ahead of the AVM portions they classify by some fixed time interval, the home station may use buffering. This is shown in FIG. 15(b). The buffer must allow enough time for the screener system to process and for the decode & presentation function to respond to the screener system commands and/or control signals. This could also be accomplished by a delay circuit. Note that if buffering or a delay circuit is used the SCCs may be sent with the AVM content they classify or before or after. The SCCs may also be sent with their own time index that informs the home station when the SCC classifies the content.

DETAILED DESCRIPTION SCREENER SYSTEM

Figure 4:
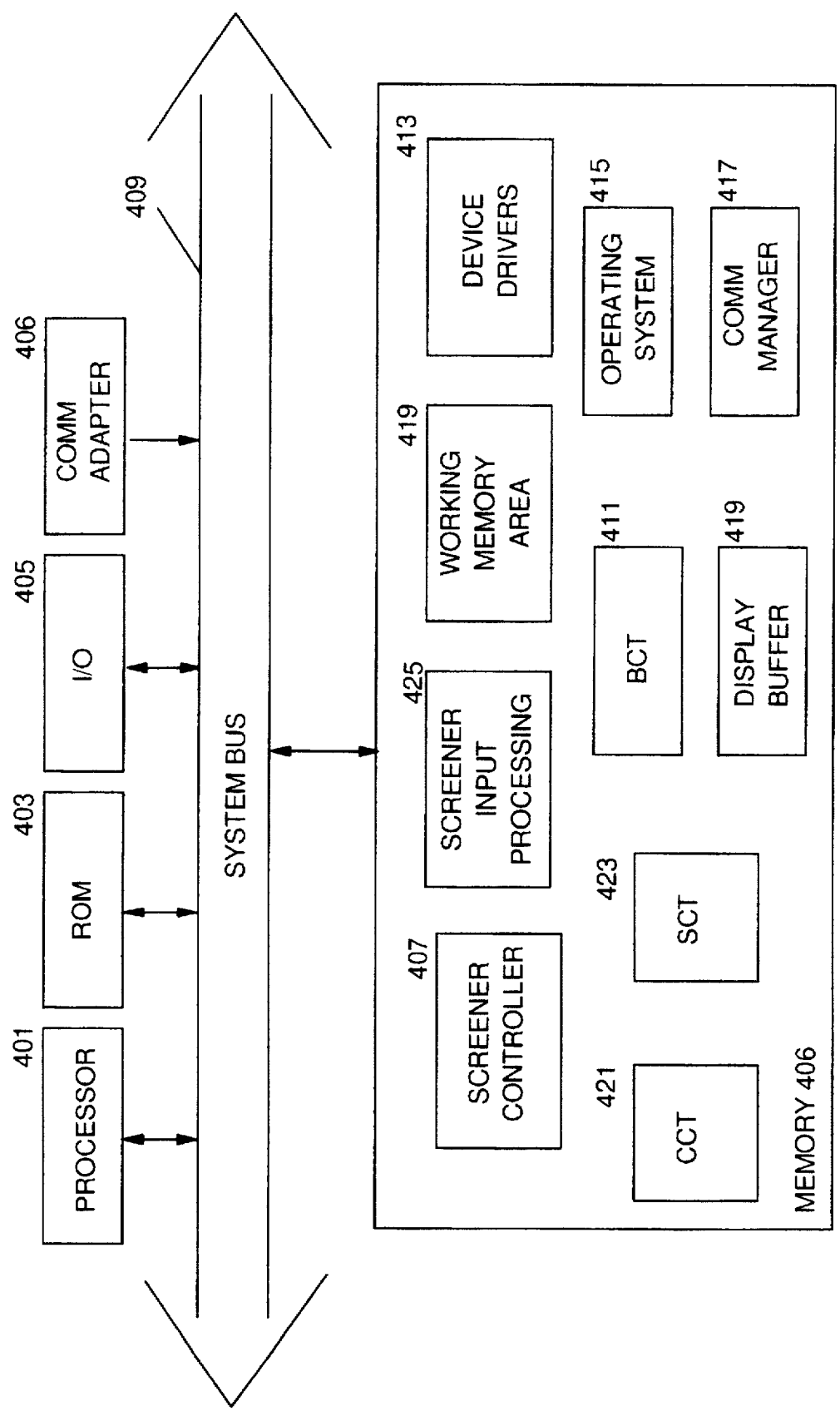
FIG. 4 a detailed view of the screener system.

The screener system is shown in FIG. 4 as having a processor 401 connected by a system bus 409 to ROM 403, I/O Controller 405 and memory 406. The screener system is depicted in FIG. 4 after it has been booted up and with several functional components/software systems located in memory 406. The screener system is a collection of functions and data items. As shown in FIG. 4 the preferred embodiment of this invention comprises a set of software systems. The screener controller 407 (i.e., the event driven process) is a software system that operates with BCT 411, CCT 421, and SCT 423. Also included is I/O controller 405 to which input devices including a keyboard, mouse and other devices may be attached. Other input devices such as other pointing devices or a voice sensors or image sensors may also be attached. The I/O 405 can be connected to communications lines, disk storage, input devices, output devices or other I/O equipment. The screener system uses the I/O 405 to communicate with the decode and presentation function. AVM manipulation commands may be sent to the decode and presentation functions with errors and status information returned.

The screener system shown in FIG. 4 may also be connected to the upstream node via the communications adapter 406. In the preferred embodiment the communications adapter 406 is a cable modem. Communications between the home station and an upstream node is provided via the communications manager 417, a software system. Communications manager 417 provides for the sending and receiving of data and requests. The memory 406 also includes screener input processing 425. The SIP 425 is a software system which prompts the subscriber for input in order to build the SCT 423 and in some embodiments the CCT 421. The input process may also require the use of PIN as a security feature of the home station. The memory 406 also includes an operating system 415, device drivers 413 which interpret the electrical signals generated by devices such as the remote or decode and presentation function. The working memory area 419 can be utilized by any of the functions or software systems and it may also be used to store the various data items. The working memory area 419 may be partitioned amongst the elements and within an element. The working memory area 419 may be utilized for communication, buffering, temporary storage, or storage of data while a program is running. Note that although shown as a single entry, the memory may consist of any combination of physical memory devices. In the preferred embodiment, the memory has ROM, RAM and FLASH memory.

In the preferred embodiment after extraction, the AVI information is then processed by the screener controller software system in the home station. This software system in the preferred embodiment is an event driven software system. The screener controller thus responds and processes events as they are generated. For purposes of describing the present invention, arrivals of AVI information are treated as events. Other events may be timer events or events initiated by the subscriber. The actions taken during collection and screening are based on the current event and may in certain circumstances also depend on the present or previous state. Thus, the screener controller handles all newly received AVI information and processes the AVI information accordingly. A channel change by the subscriber also generates an event.

Event handling in the home station may result in the writing/reading/update/deletion of information in the behavior collection table (BCT) and/or the transmission of information from the home station to other nodes in the Interactive TV system. Event handling may also result in the screening of AVM presentations. Events may be initiated in response to receipt of AVI information or may be initiated by a subscriber (i.e., power on, channel change, jump, channel up & channel down, swap, pause, FF, REWIND, OFF, MUTE, RECORD, Picture-In-Picture, etc or any combination of the above). In addition to generating events in certain circumstances the home station responds to events, such as timer events (i.e., no AVI timer and/or surfing filter timer). This response may be to change a state variable, or to record information in the BCT or transmit information or modify the presentation of AVMs in some fashion or any combination of the above.

One way of implementing the screener controller function is depicted in FIG. 6. FIG. 5 depicts some of the variables required for behavior collection in the home station. The method described in FIG. 6(a) through FIG. 6(k) is based on the behavior collection table depicted in FIG. 10. In step 6001, the home station is activated. This is typically performed by the subscriber turning the home station "ON" but the home station may automatically turn itself on at a preselected time. In step 6001, the home station may select the channel that the home station was tuned to prior to deactivation or the boot up channel or a preprogrammed channel. The home station may tune to a listing or channel guide channel to facilitate building or updating the CCT.

In step 6003 the home station is initialized and may perform initialization activities required to prepare the home station for behavior collection and screening. These initialization activities may include locating or allocating space in memory for the tables (BCT, SCT, CCT), initializing variables, preparing for reporting of results, preparing the tables, determining available memory, and/or the transmission of information previously collected. Initialization may also entail populating the CCT where data may be obtained by tuning to a listing or channel guide channel and receiving general classification data from the channel. The CCT information may be sent through a single channel dedicated to data transmission concerning all channels. Such an out-of-band channel can be a modulated data carrier in the FM band. This information also may be encoded in the AVM stream similar to the AVI information. Thus, CHANNEL ID, GENERAL RATING & TIME INTERVAL could be provided for each channel. This information is used to update or build the CCT.

FIG. 6(*b*) depicts the initialization procedure of one particular embodiment. The initialization procedure checks if the BCT was not sent prior to a power off event. In step 6011, a check is made to determine if BCT should be transmitted. This check may use the current size of the BCT against a size threshold or a time based parameter (i.e., the collected data is getting old). If the threshold is met or exceeded the BCT is sent. Alternatively, the home station may follow the rule that all BCT information should be transmitted on startup. If the BCT does not capture AVM manipulation commands applied to the selected AVM stream then in step 6013 the SCT may be sent back when the BCT is sent. However, to conserve up stream bandwidth the SCT may only be sent back when the subscriber changes the SCT or whenever the upstream node requests that the SCT be sent.

If the BCT is to be sent then the procedure depicted in FIG. 6(*i*) is carried out. In step 6013 an AVI Timer is started. The AVI Timer allows the home station to determine when a channel is not providing AVI information. The AVI timer is started by setting AVI.Timer=$T_{AVI}$. The timer is started such that after a predetermined time, $T_{AVI}$, the timer will create an event to be serviced by the event handler. The home station also has the state variable AVI. State that indicates the state of the collection process with respect to AVI information. In step 6014 this variable is set to AVI. State=NO_AVI. This indicates that no AVI information has been received in the current timer interval. Note that both AVI.Timer and AVI.State are described in FIG. 5. The initialization routine is returned to the main loop in step 6015.

After the initialization as discussed in the initialization procedure, the home station enters a wait for event state as shown in FIG. 6(*a*), step 6005. In step 6005 the home station is waiting for an event. The home station waits for events in step 6005 and when an event is generated it identifies the appropriate event handling procedure to process the event. For instance when AVI information is decoded it generates an event the wait event step process determines that the AVI arrival event handler should process the event. The newly received AVI information is provided to the AVI arrival event handler and is executed to process the AVI arrival event. When the subscriber changes channels a channel change event is generated and processed accordingly. Note that with advent of Picture-in picture multiple AVMs may be presented to the subscriber at the same time. Multiple presentation of AVMs requires that the home station or an attached device and the home station have the capability for multiple tuners or multiple channels including multiple decode & presentation functions.

Step 6005 receives events and causes the execution of appropriate procedures or processes to handle the events as generated. Step 6007 executes the event handler for the specific type of event. The event handlers and associated procedures will be discussed herein. Events may be queued for execution with higher priority events executed first. Events may also be processed on a first come first served basis. In this particular embodiment in step 6005, the home station is waiting for one of several types of events: a channel change event, an AVI arrival event, a power off event, a timer countdown event or a received command event. These will be described in turn. Each event has its own event handler as shown respectively in FIG. 6(*c*), 6(*d*), 6(*e*), 6(*h*) and 6(*j*) in step 6007 of FIG. 6(*a*).

When a channel change event occurs as a result of a subscriber changing channels, the event is handled as shown in FIG. 6(*c*). The channel change event may be detected by input from the remote or a controller or a channel changer or from the channel selector. The Channel Identifier is provided in order for screener controller to apply the appropriate AVM manipulation command, as shown in step 6030. Step 6030 is detailed in FIG. 6(*k*). In step 6203 the general classification code is obtained from the CCT using the channel identifier and the current time, if the CCT includes an associated time interval. The current time can be obtained from a time of day clock in the home station. In step 6205 the screener controller uses the obtained general classification code to obtain an AVM manipulation command from the SCT. In step 6207, the screener controller sends appropriate control signals to the decode and presentation function to cause the decode and presentation function to carry-out the AVM manipulation command. The screener controller could also check to determine if the newly obtained AVM manipulation command is different then the previously applied AVM manipulation command. If the NEW_MC=LAST_MC then step 6207 could be skipped. If NEW_MC≠/LAST_MC then step 6207 is carried out and LAST_MC= NEW_MC.

Returning to FIG. 6(*c*), after applying the appropriate AVM Manipulation command if any, the channel change event handling procedure checks the AVI. State variable in Step 6031. If the AVI.State=NO_AVI, indicating that there has been no AVI information received in the current $T_{AVI}$ period, then the channel change event simply returns to the wait event state as shown in step 6037. However, if the AVI.State≠NO_AVI then AVI.State=NO_AVI in step 6033. This indicates that no AVI information has been received on the new channel. In step 6034 an AVI Timer is started. The AVI Timer allows the home station to determine when a channel is not providing AVI information. The AVI timer is started by setting AVI.Timer=$T_{AVI}$. After a predetermined time, $T_{AVI}$, the timer will create an event to be serviced by the event handler provided the timer is not reinitialized. In step 6035, we close the BCT record associated with the previous channel. The so procedure knows that there is an open BCT record because the AVI. State≠NO_AVI by virtue of step 6031 in this branch of the channel change event handler. Step 6037 returns to the wait for event state.

Figure 6A:
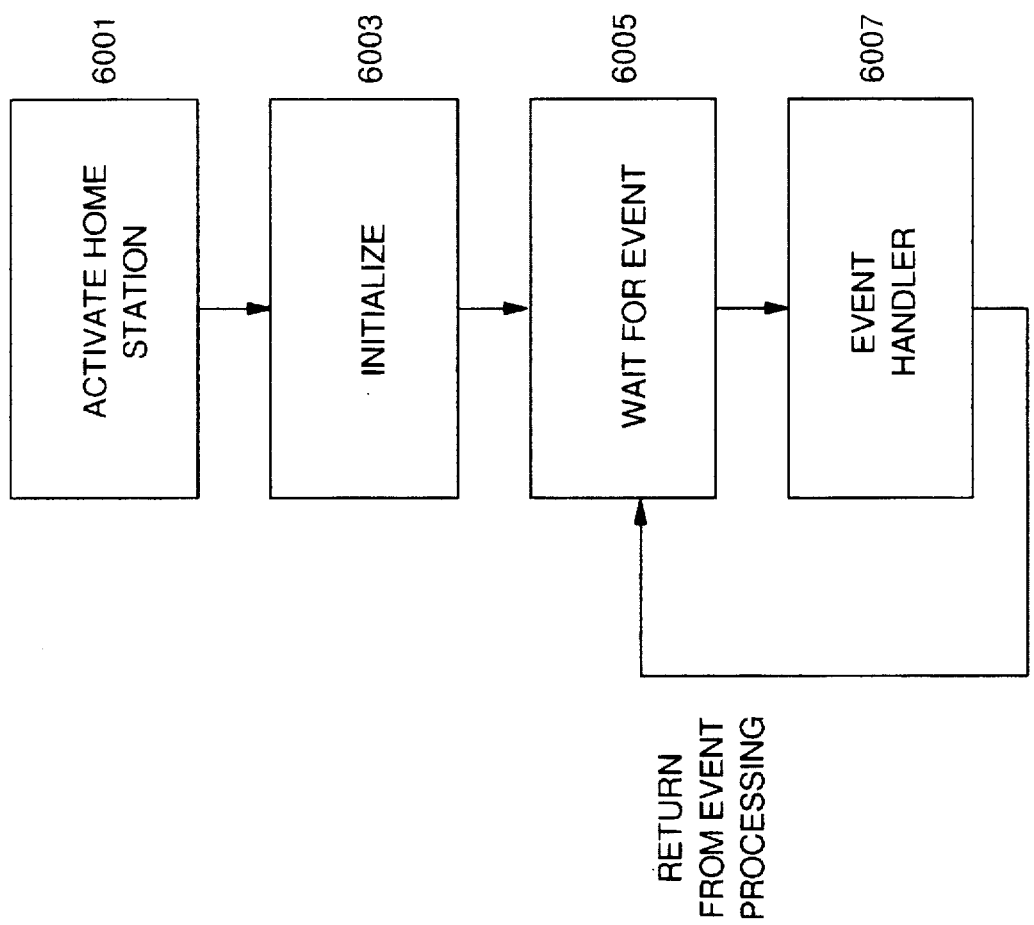
FIG. 6(a) provides an overview of an event driven embodiment of the collection process in the home station.
Figure 6B:
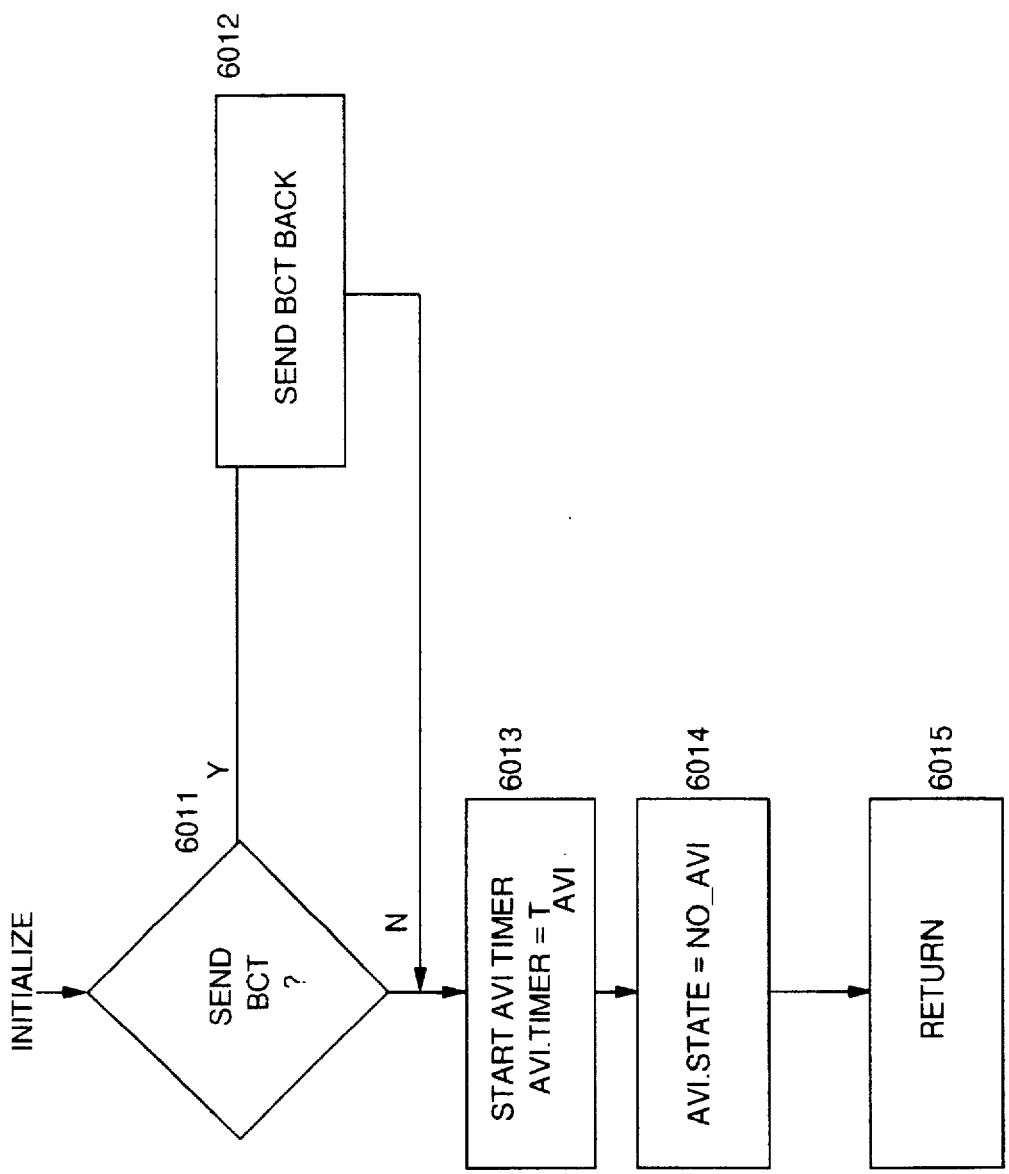
FIG. 6(b) provides the initialization sequence for an event driven collection process FIG. 6(c) provides the collection process response to a channel change event.
Figure 6C:
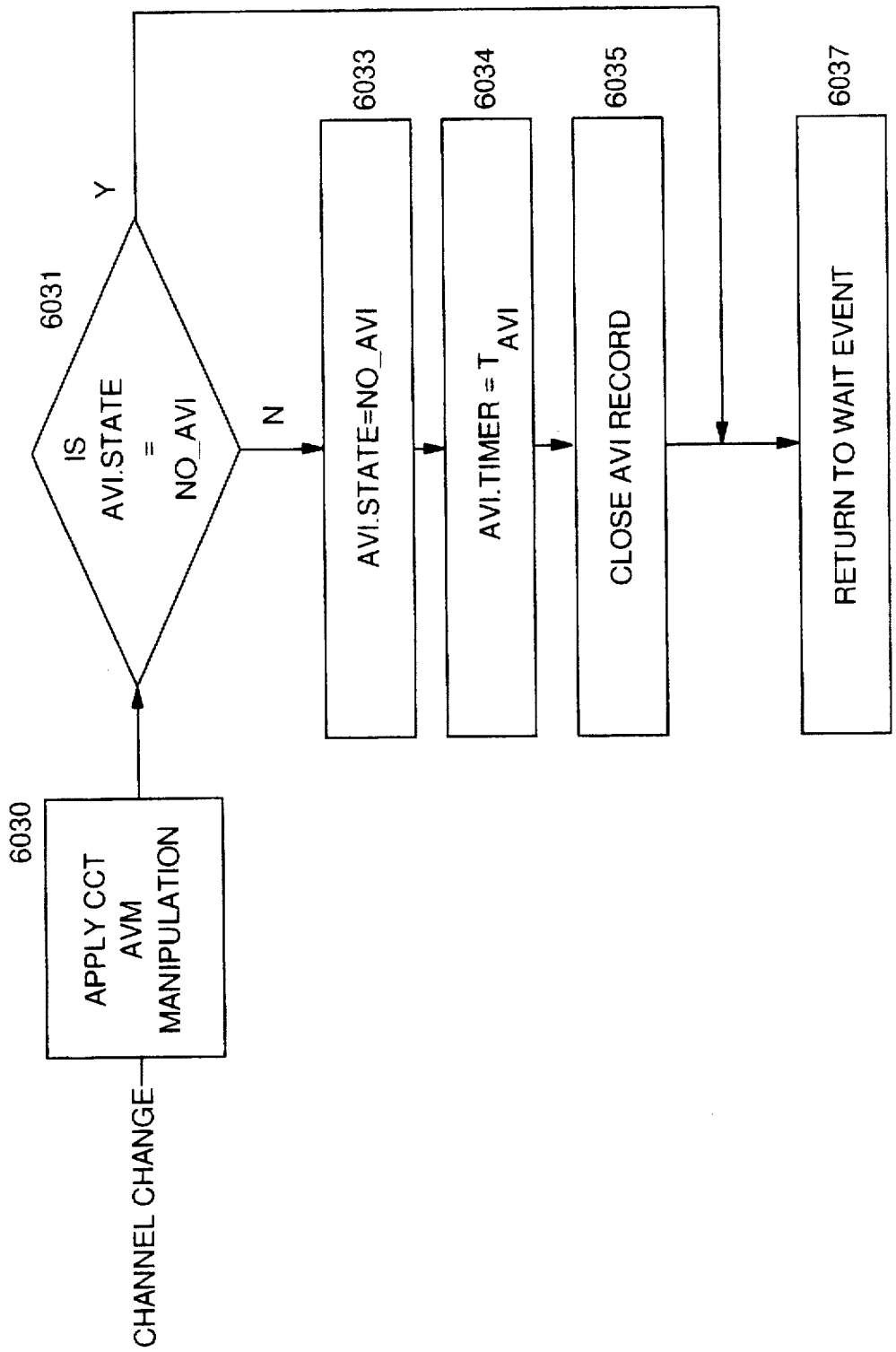
FIG. 6(d) shows the collection process response to the arrival of AVI information.
FIG. 6(e) shows the collection process response to a power off event.
FIG. 6(f) shows the open AVI record procedure.
FIG. 6(g) shows the close AVI record procedure.
FIG. 6(h) shows the AVI timer countdown complete event.
FIG. 6(i) shows the Send BCT procedure.
FIG. 6(j) shows the collection process response to a received command.
FIG. 6(k) shows the apply AVM manipulation command procedure.
Figure 6D:
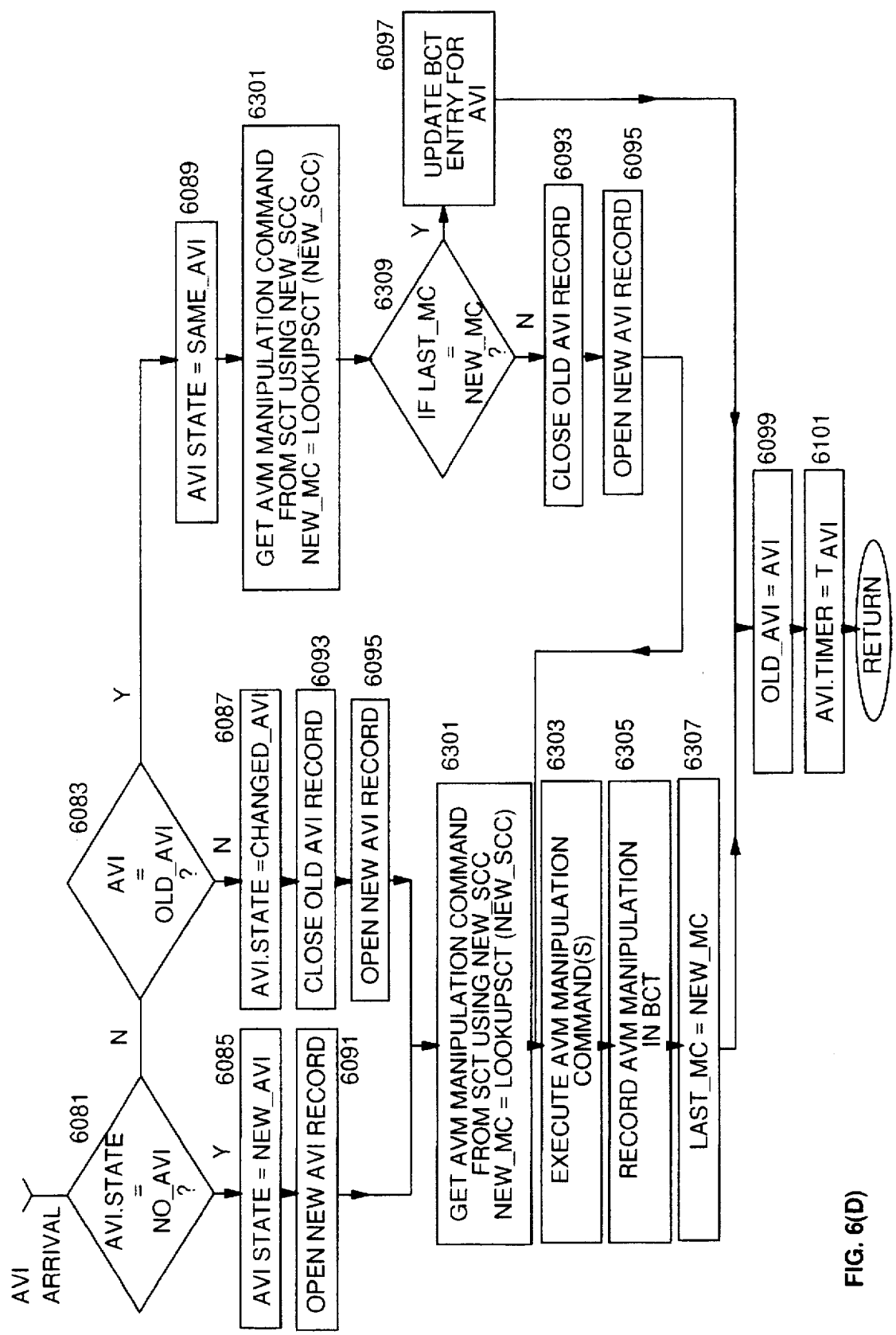
Figure 6E:
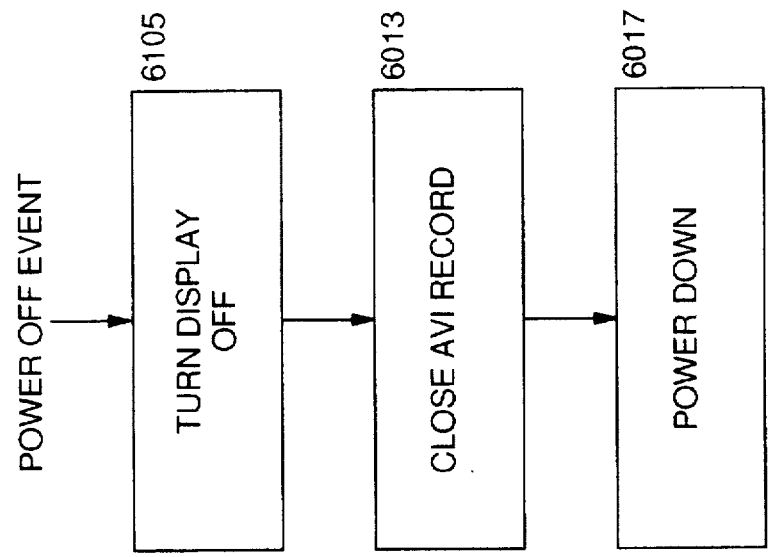

If in the wait for event step 6005 an AVI is detected or the arrival of an AVI is detected, the AVI arrival is processed by the AVI arrival event handler. The AVI arrival event handler is shown in FIG. 6(*d*). The processing of AVI information can result in the generation of other events (i.e., transmission events, screener events, etc.) and/or kick off other processing. In the AVI arrival event handler, it is first determined if AVI.State=NO_AVI. This is shown in step 6081. If the AVI.State=NO_AVI, then in step 6085 AVI.State=New_AVI indicating that the home station has received an AVI and where it had previously not received one in the previous time period. Note that as it is used this discussion, AVI is referring in particular to the AVI identification number. Proceeding to step 6091, a new BCT entry is created using the newly received AVI identification number. The newly received screener code (NEW_SCC), if any, is processed next. In step 6301 the AVM manipulation command associated with the NEW_SCC is obtained from the SCT. In step 6301 NEW_MC is assigned to the AVM manipulation command associated with the NEW_SCC. NEW_SCC is the newly received SCC. In step 6033 the NEW_MC command is executed to manipulate the AVM stream. Step 6303 may entail sending control signals and/or commands to the decode and presentation function. In step 6305, the NEW_MC is recorded in the BCT record opened in step 6091 (or step 6095). In step 6307 the LAST_MC is assigned to the NEW_MC. The LAST_MC variable is utilized to reduce the size of the BCT. Because the possibility exist that one or more SCCs will be associated with the same AVM Manipulation Command, space in the BCT can be saved when the SCC changes by their associated AVM manipulation commands are the same. Note that if the SCC is not available then the AVM manipulation command obtained in step 6301 is obtained using steps 6203 and step 6205 as shown in FIG. 6(k) and described above.

Returning now to step 6081, if the AVI.State≠NO_AVI then in step 6083 a comparison is made between the AVI identification number of the AVI generating the current event and the OLD_AVI identification number. The OLD_AVI is the previous AVI identification number that was used in processing the previous AVI arrival event (see Step 6099). If the newly-received AVI identification number does not equal the OLD_AVI identification number, then steps 6087, 6093, 6095, 6301, 6303, 6305 and 6307 are carried out. In step 6087, AVI.State=CHANGED_AVI. In step 6093 any open BCT records are closed in the BCT table (the entry in the BCT table associated with the OLD_AVI). In step 6095 a new entry is created in the BCT for the newly arrived AVI Identification number. Steps 6301, 6303, 6305 and 6307 are performed as described above.

Returning to step 6083, if the newly-received AVI equals the previously-received AVI or if the AVI equals the old AVI, then in step 6089, AVI.State=SAME_AVI. In step 6301 NEW_MC is assigned to the AVM manipulation command associated with the NEW_SCC. NEW_SCC is the newly received SCC. In step 6309, a check is performed to determine whether the NEW_MC is different then the previously determined LAST_MC. Step 6309 results in saving some space in the BCT. If the NEW_MC=LAST_MC then last time index in the BCT for the AVI is updated as shown in step 6097. Returning to step 6309, if the NEW_MC is different then LAST_MC then the existing BCT record for the AVI is closed as shown in step 6093 and a new AVI record is opened in step 6095. Although, the open and closed records will have the same AVI the time indexes and AVM manipulation commands will be different. The use of two different AVM manipulation commands for different portions of the AVM necessitates the use of more then one BCT record. After closing and opening the respective BCT records the NEW_MC command is executed in step 6303, the NEW_MC is recorded in BCT in step 6305, and LAST_MC is set equal to NEW_MC as shown in steps 6307. Steps 6301, 6303, 6305 and 6307 are described above in more detail.

With any AVI arrival, steps 6099 and 6101 are performed. In step 6099, OLD_AVI is set equal to the newly-received AVI identification number. In step 6101 the AVI timer is reset, AVI.Timer=$T_{AVI}$ and the process returns to await or process other events.

Another type of event that may be handled by the event handler is a power off event. A power off event may result from a power outage or from a subscriber shutting off the home station typically using the remote. The event handler for a power off event is shown in FIG. 6(e) wherein step 6105 the display or presentation mediums are turned off This is an optionally step that provides the subscriber with feedback to the power off event. In step 6013 any opened AVI records are closed. Although not shown, an additional step may send the entire BCT table upstream. The entire BCT may be sent back in accordance with the send BCT back procedure. The home station is then powered down in step 6017. In alternative embodiments, the power off event may simply save the BCT, SCT and/or CCT to non-volatile memory such as a flash memory, such that on power up, the BCT, SCT and CCT might be utilized. The power off event processing procedure may also perform other house keeping tasks for the home station.

Another event that may occur in the wait for event step 6005 is the AVI timer complete event. The AVI timer complete event handling is shown in FIG. 6(h). In step 6191, AVI.State=NO_AVI indicating that no AVI information was available. In step 6193, the current AVI is cleared. This may be done simply by setting the old AVI equal to null (i.e., OLD_AVI=Null) or some other variable. Step 6193 may also clear LAST_MC by setting LAST_MC=Null. Control then returns to process or await other events.

Figure 6F:
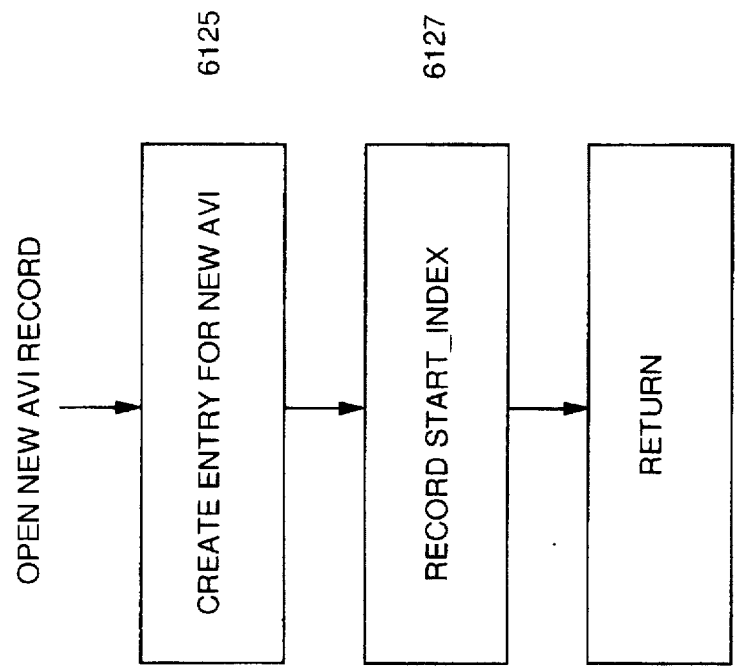

FIG. 6(f) shows the open new AVI record procedure (create new BCT entry). Step 6125, creates an entry for the newly received AVI Identification Number. Step 6127, records the start index in the newly-created entry. A more sophisticated technique may be used to account for the fact that contiguous showing of a TV programs may have commercials shown using different AVI Identification numbers as discussed previously. The open procedure may also set AVM manipulation command in the newly opened record to null or to NEW_MCI.

Figure 6G:
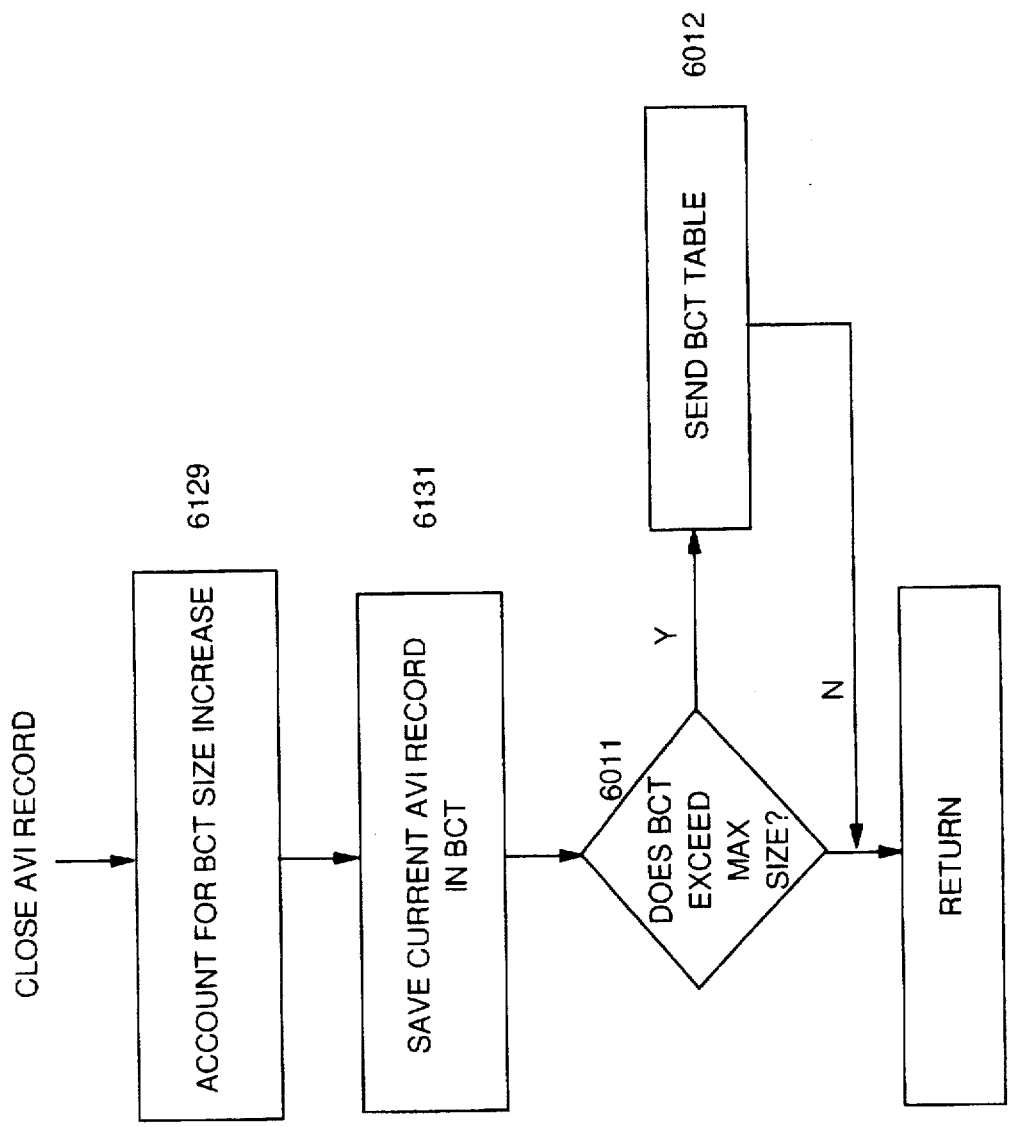
Figure 6H:
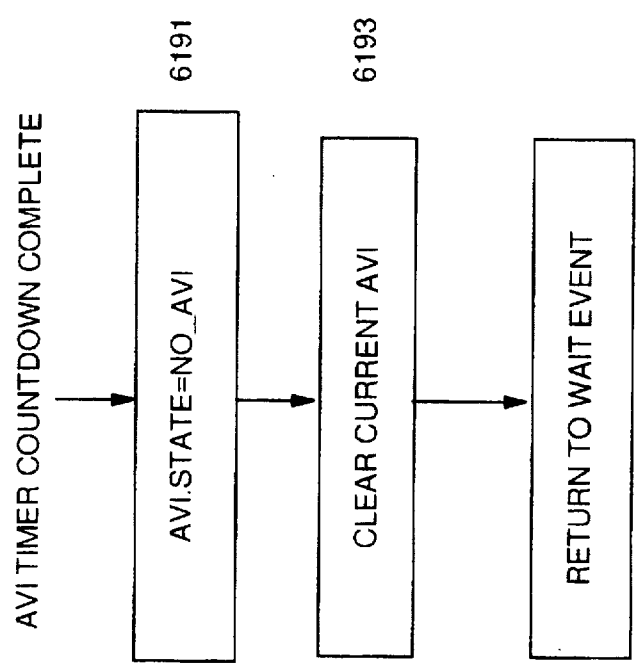

The close AVI record procedure is shown in FIG. 6(g). In step 6129, the procedure accounts for the size increase. This may simply provide a length counter increment for the behavior collection table. In step 6131 the current AVI record is saved or closed in the BCT. Steps 6011 and 6012 demonstrate another feature of the invention where, if BCT records are not transmitted on the fly, then there is the ability to transmit the BCT table when it reaches a predetermined threshold size. This threshold can be based on memory capacity. In step 6011, the BCT is checked to determine if the BCT size or the number of entries in the BCT table have exceeded a predetermined BCT maximum threshold. If the threshold is exceeded, then the send BCT table back procedure is invoked in step 6012. Otherwise, control is transferred back to await or process other events. Note that the closed AVI record procedure as defined in FIG. 6(f) assumes that the home station only sends the BCT table when the home station is powered up, powered off or when the BCT table exceeds a certain size. However, an alternative embodiment is to send BCT records back on the fly. Thus, whenever an AVI record is closed, we would also transmit back that particular entry to the behavior collection center.

Figure 6I:
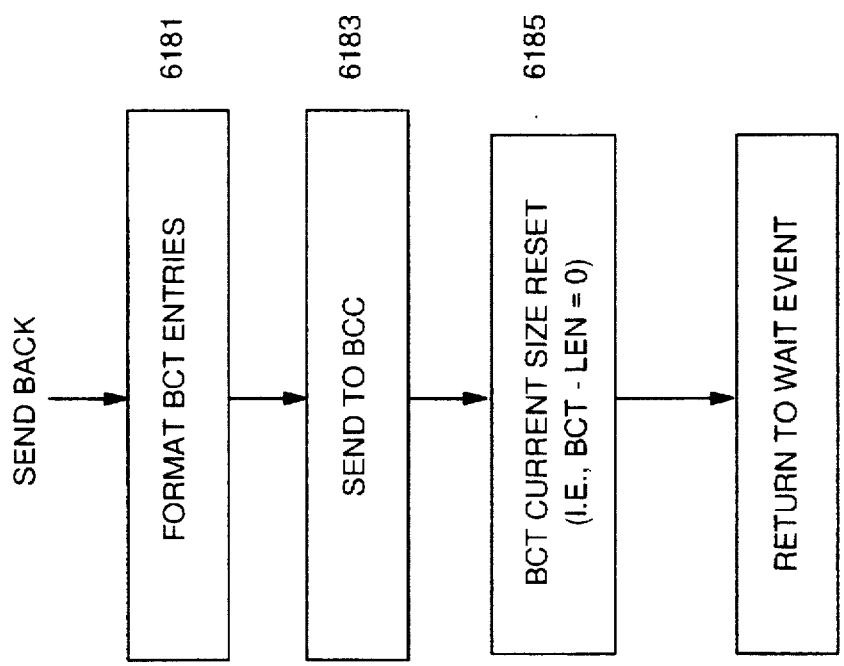

The Send BCT information back procedure is described in FIG. 6(i). The BCT entry or entries are formatted in step 6181. Step 6181 can involve compression, packetization, error correction codes and/or encryption. Step 6181 may also involve extracting relevant information from the BCT. Thus, if title information were obtained from the AVI it does not need to be sent because the associated AVI identification number can be used to identify the title at the BCC. FIG. 14 depicts some additional information that may be included with the BCT information. Thus, Home Station Identification number 1401 which may be found in memory of the home station, the Subscriber number 1403 which may be the subscriber account number or the identity of the particular subscriber in the household, a time stamp 1405 for indicating when the BCT information was transmitted, and the appropriate entries from the BCT 1407. Any combination of these fields may be sent. Transmission of the BCT or a BCT entry is shown in 6183. Transmission involves adapting the data to be sent to the communications medium and protocol desired. A cable modem may be utilized to send information upstream. Depending on the number of BCT entries to be sent and the modem speed, a background transmission process may be started to provide information to the upstream node (i.e., the BCC). Any of a number of communications protocols may be utilized. In step 6185, the BCT is updated to reflect that BCT information was transmitted. This may entail deletion of entries sent and or updating a state variable or size and time variable updates. Note that if error detection and correction is desired, step 6185 will not commit the BCT data until successful transmission has occurred. There are a wide variety of techniques for maintaining the integrity of the data until successful transmission. Control is then returned to the procedure that requested transmission of the BCT.

The collected data table may be reported to the BCC on the fly (i.e., as the information is created) that is as the table entries are made or periodically or as requested by the BCC when the data table is nearing full or some combination of the above. The data table may also be queried at any time by the BCC. The BCC may send a Send data command to the home station requesting that it send BCT data. When reported, the data table is appended with several other subscriber related fields. FIG. 14 shows a logical view of the information each home station provides to the BCC. As shown in FIG. 14, these fields may consist of the following HOME STATION IDENTIFICATION NUMBER 1401, HOME STATION SUBSCRIBER (i.e., CUSTOMER ID) 1403, TIME-STAMP 1405 the time stamp 1405 defines when the data was assembled for transmission to the distribution node. The collected data table or portion thereof is shown as block 1407. This information may be packetized, compressed, encrypted or any or none of the foregoing. The resultant data is sent back to the BCC by the home station via the reverse or upstream channel. The procedures described above for sending the BCT to the BCC may also be used to send the SCT back to the BCC when AVM manipulation is not captured in the BCT.

Figure 6J:
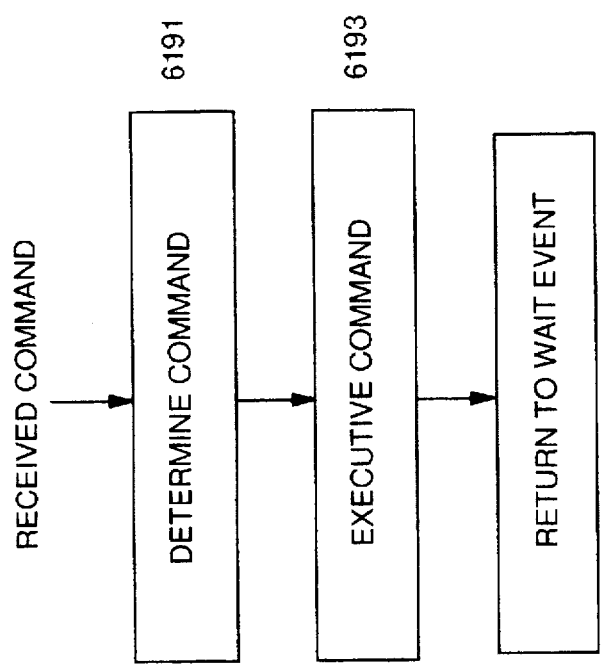
Figure 6K:
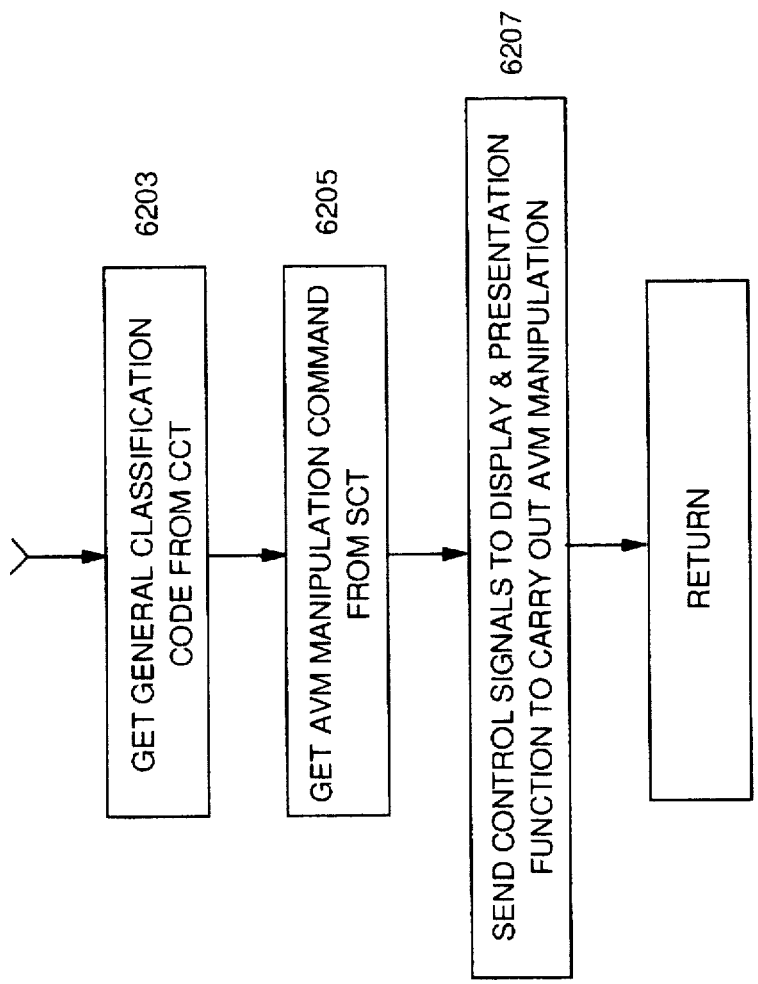

FIG. 6(j) I depicts the response to a command received from an upstream node. The command may cause the home station to change variable parameters such as $T_{AVI}$, $T_{SURF}$, enable or disable home station features such as a surfing filter, send BCT data upstream, send SCT data upstream, reset or any other home station operation. The command may also cause the home station to present a message to the subscriber. The home station response will depend on the command set and data sent with the command. FIG. 6(j) step 6191 the particular command is determined from the command set and in step 6193 the command is executed. Thus, for the case of a send BCT table command the send command is determined in step 6191 and in step 6193 the send BCT procedure is invoked. The home station can use a similar procedure to send the SCT back upon request or command. The send SCT back command is useful in an alternative embodiment where the BCT does collect information on AVM manipulation. If the BCC has the subscribers SCT and the BCT without the AVM manipulation then the BCC can reconstruct what manipulation was applied to the AVM presented to the subscriber as captured in the BCT.

Note that the home station may respond to a command to update the software on the home station. This can be accomplished by the home station in response to a such a command executing a special program which might tune the home station to a particular channel and start downloading the new software system. Such a command can be used to update information in the CCT. The downloaded system would then be installed in the home station.

Channel Surfing Filter

FIG. 7 and FIG. 8 will now be used to illustrate an alternative embodiment that includes a channel surfing filter. FIG. 7 depicts some of the variables required for behavior collection in the home station when implementing the channel surfing filter. Note the addition of the Surf Timer and the Surf State variable. As with the embodiment discussed with respect to FIG. 5 and 6, the basic event handling scheme is still utilized. This particular implementation uses the BCT structure depicted in FIG. 11. The processing for each event varies as described herein.

Figure 8A:
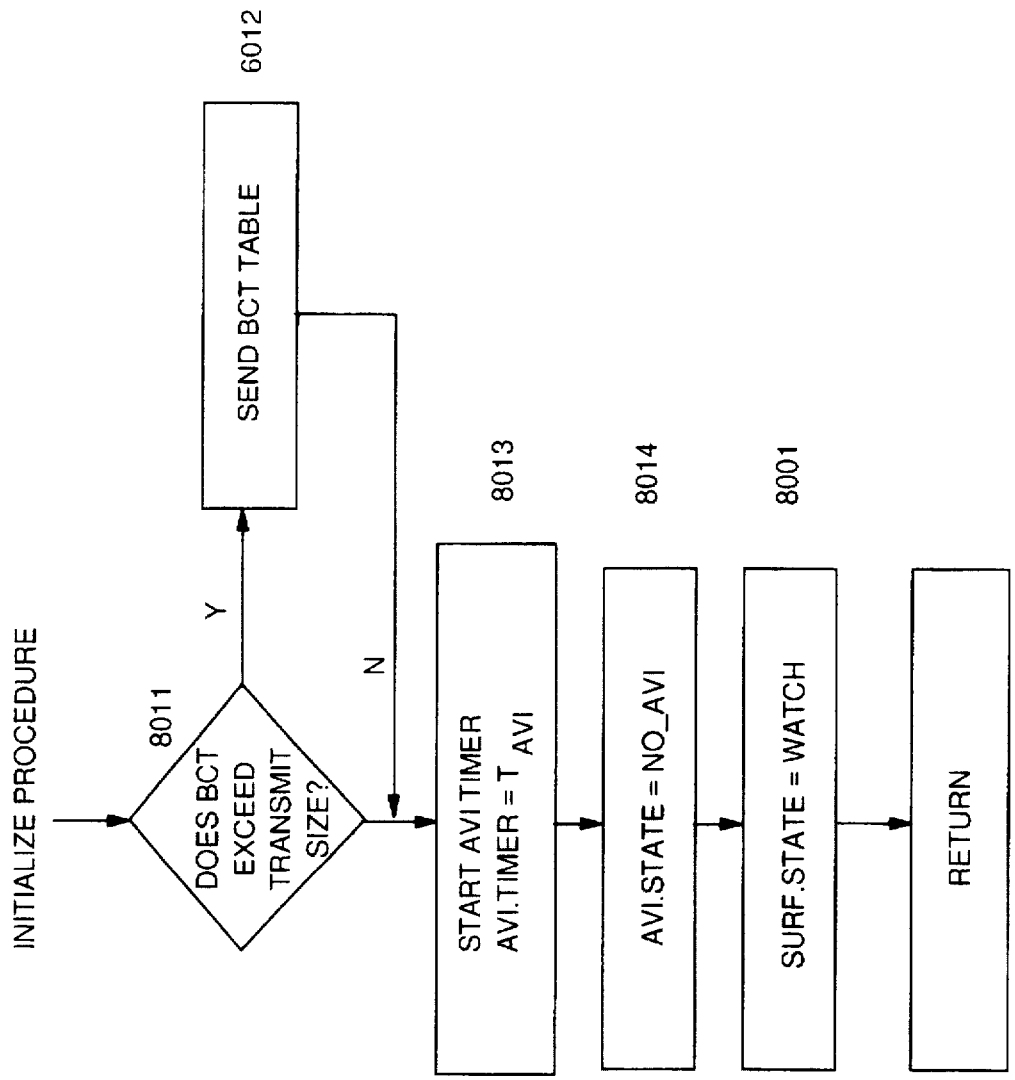
FIG. 8(a) provides the initialization sequence for an event driven collection process with channel surfing filter.

FIG. 8(a) depicts an initialization procedure required for behavior collection with the channel surfing filter embodiment. In step 8011, the initialization procedure checks to determine if the BCT should be sent upstream, in case the BCT was not sent prior to a power off event. This check may use the current size of the BCT against a size threshold or a time based parameter (i.e., the collected data is getting old). If the threshold is met or exceeded the BCT is sent. Alternatively, the home station may follow the rule that all BCT information should be transmitted on startup. If the BCT is to be sent then the procedure depicted in FIG. 6(I) is carried out. If the BCT does not capture AVM manipulation commands applied to the selected AVM stream then in step 6012 the SCT may be sent back when the BCT is sent. However, to conserve up stream bandwidth the SCT may only be sent back when the subscriber changes the SCT or whenever the upstream node requests the SCT be sent. In step 8013 an AVI Timer is started. The AVI Timer allows the home station to determine when a channel is not providing AVI information. The AVI timer is started by setting AVI.Timer=$T_{AVI}$. The timer is started such that after a predetermined time, $T_{AVI}$, the timer will create an event to be serviced by the event handler. The home station also has the state variable AVI. State that indicates the state of the collection process with respect to AVI information. In step 8014 this variable is set to AVI.State=NO_AVI. This indicates that no AVI information has been received in the current AVI timer interval. Note that both AVI.Timer and AVI.State are described in FIG. 7. In step 8001, SURF.STATE=WATCH. Thus, the initial presumed state as the home station at initialization is WATCH or the no channel surfing state. The initialization procedure then returns to the wait or process next event state.

Figure 8B:
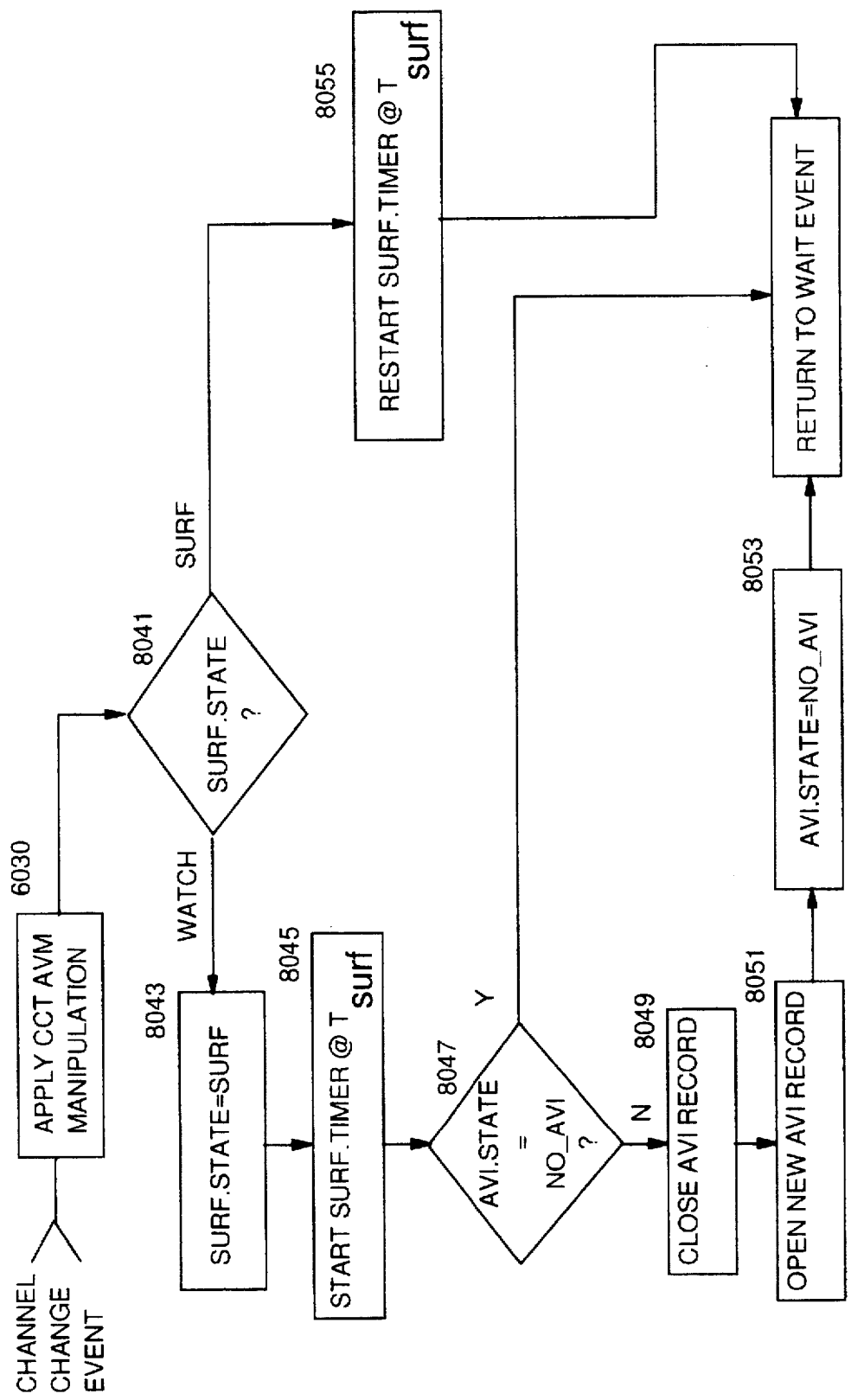
FIG. 8(b) provides the collection process in response to a channel change event with channel surfing filter.

FIG. 8(b) depicts the home station's response to a channel change event when the channel surfing filter is enabled. When a channel change event occurs as a result of a subscriber changing channels, the event is handled as shown in FIG. 8(b). The channel change event may be detected by input from the remote or a controller or a channel changer or from the channel selector. The Channel Identifier is provided in order for screener controller to apply the appropriate AVM manipulation command, as shown in step 6030. Step 6030 is detailed in FIG. 6(k). In step 6203 the general classification code is obtained from the CCT using the channel identifier and the current time, if the CCT includes an associated time interval. The current time can be obtained from a time of day clock in the home station. In step 6205 the screener controller uses the obtained general classification code to obtain an AVM manipulation command from the SCT. In step 6207, the screener controller sends appropriate control signals and/or commands to the decode and presentation function to cause the decode and presentation function to carry-out the AVM manipulation command. The screener controller could also check to determine if the newly obtained AVM manipulation command is different then the previously applied AVM manipulation command. If the NEW_MC=LAST_MC then step 6207 could be skipped. If NEW_MC≠LAST_MC then step 6207 is carried out and LAST_MC=NEW_MC.

Returning to FIG. 8(b), in step 8041 the SURF.STATE is checked to determine whether the SURF.STATE is SURF or WATCH. If the SURF.STATE=WATCH, then in step 8043 SURF.STATE=SURF thus changing the state from WATCH to SURF. Thus, after a channel change the presumed surf state is surfing. In step 8045 the surf timer is started and initialized to a value of $T_{SURF}$. Thus, a timer event will be generated after a $T_{SURF}$ time period. Note in the preferred embodiment $T_{SURF} > T_{AVI}$. $T_{SURF}$ is the amount of time in which a subscriber is tuned to a particular channel in order to be considered as watching the AVM(s) on the channel or not to be surfing. After starting the surftimer, the AVI.STATE is checked in step 8047. If the AVI.STATE=NO_AVI, then we return to the main processing to process other events or await other events. If, however, the AVI.STATE≠NO_AVI, then the existing AVI record is closed in step 8049 and a new BCT entry is created with the new AVI in step 8051, and the AVI.STATE=NO_AVI in step 8053 and control returns to the wait event state of the main event handling loop. Returning to step 8041, if SURF.STATE=SURF, then in step 8055 the SURF timer is reinitialized to a value of $T_{SURF}$ (i.e., SURF.TIMER=$T_{SURF}$). Thus, the SURF.STATE remains in the SURF.STATE until the timer should expire unless, of course, another channel change event is detected wherein the SURF timer will, of course, be re-initialized or restarted.

After reinitializing the surf timer the initialization procedure returns to the main wait event handling routine.

Figure 8C:
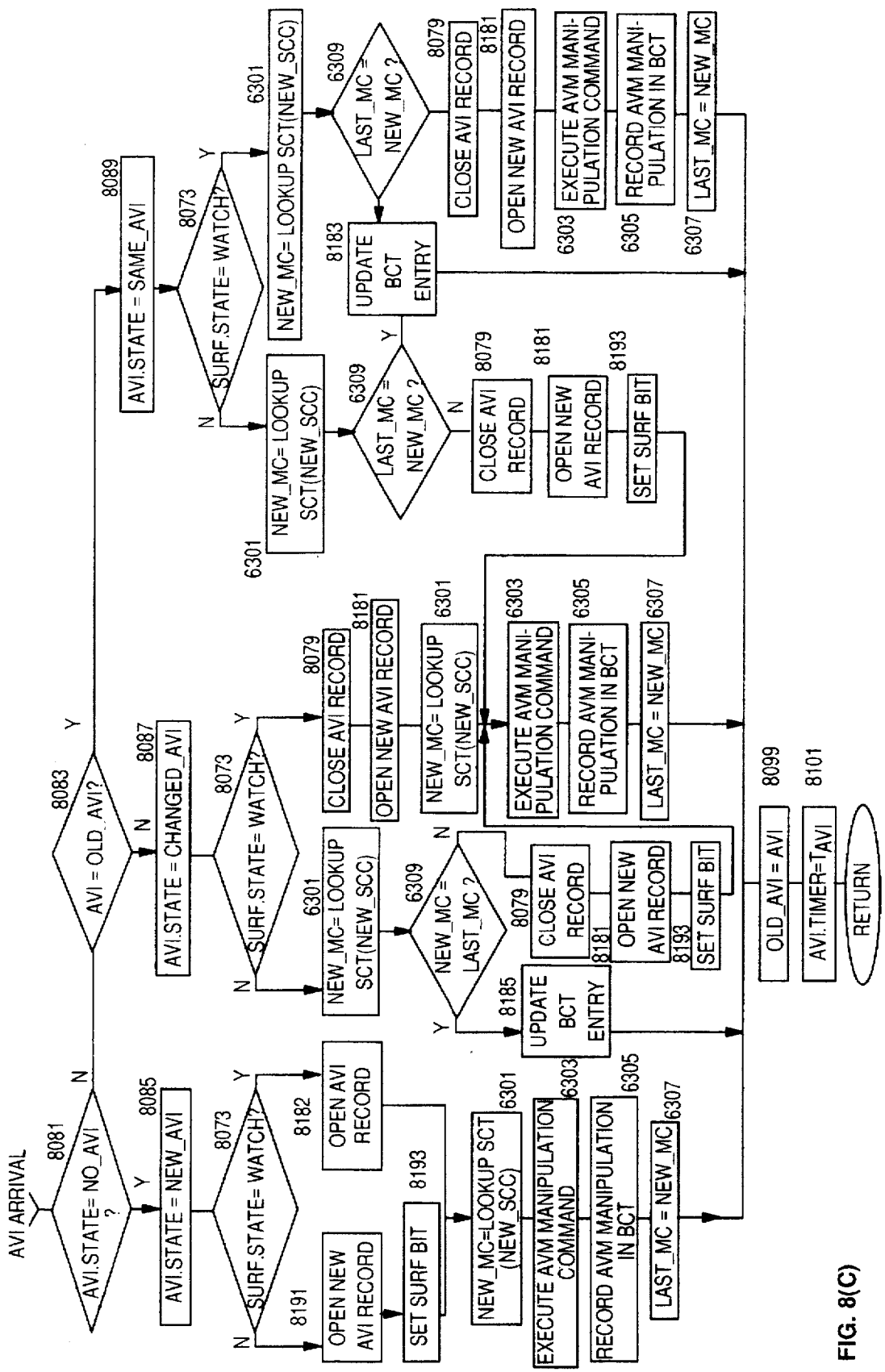
FIG. 8(c) shows the collection process response to the arrival of AVI information with channel surfing filter.

FIG. 8(c) depicts the processing performed by the home station in response to an AVI arrival event with the Channel Surfing Filter enabled and with Screening enabled. In step 8081 the AVI.STATE is checked. If the AVI.STATE=NO_AVI, then in step 8085 AVI.STATE=NEW_AVI. If, however, in step 8081, AVI.STATE≠NO_AVI, then in step 8083 the home station compares the existing AVI to the previous received AVI or the OLD_AVI. If these two are equal, then AVI.STATE=SAME_AVI in step 8089. If, however, the AVI is not equal to the OLD_AVI, then in step 8087, AVI.STATE=CHANGED_AVI. Having set the AVI.STATE variable either in step 8085, 8087 or 8089, then in step 8073 in each of the three branches the SURF.STATE is checked.

In the NEW_AVI branch, if the SURF.STATE=WATCH indicating that channel surfing has not been established, then in step 8182 a new BCT record is opened with the new AVI without the surf bit being set. If SURF.STATE=SURF then in step 8191 a new BCT record is opened with the new AVI and in step 8193 the surf bit is set. Regardless of the SURF.STATE steps 6301, 6303, 6305 and step 6307 are performed as described above.

In the CHANGED_AVI branch, if the SURF.STATE=WATCH indicating that channel surfing has not been established, then in step 8079 any BCT entry with the previous AVI is closed, in step 8181 a BCT entry is created with the newly received AVI, steps 6301, 6303, 6305 and 6307 are then performed as described above. If SURF.STATE=SURF then in step 6301 NEW_MC is assigned to the AVM manipulation command associated with the NEW_SCC. NEW_SCC is the newly received SCC. In step 6309, a check is performed to determine whether the NEW_MC is different than the previously determined LAST_MC. Step 6309 may result in saving space in the BCT. If the NEW_MC=LAST_MC then last time index in the BCT for the AVI is updated as shown in step 8185. Returning to step 6309, if the NEW_MC is different then LAST_MC then existing BCT record for the AVI is closed as shown in step 8079, a new AVI record is opened in step 8181, the surf bit is set in step 8193 and steps 6303, 6305 and 6307 are performed as described above.

In the SAME_AVI branch, regardless of the SURF.STATE, in step 6301 NEW_MC is assigned to the AVM manipulation command associated with the NEW_SCC. NEW_SCC is the newly received SCC. In step 6309, a check is performed to determine whether the NEW_MC is different than the previously determined LAST_MC. Step 6309 may result in saving space in the BCT. If the NEW_MC=LAST_MC then last time index in the BCT for the AVI is updated as shown in step 8183. Returning to step 6309, if the NEW_MC is different then LAST_MC then existing BCT record for the AVI is closed as shown in step 8079, a new AVI record is opened in step 8181, the surf bit is set in step 8193 if SURF.STATE=SURF, and steps 6303, 6305 and 6307 are performed as described above.

Regardless of whether the SURF.STATE is WATCH or SURF or what particular state the AVI.STATE variable is in, in step 8099 we set the OLD_AVI equal to the current AVI and we reset the AVI.timer=$T_{AVI}$ in step 8101 and return to the wait event handling state of the main routine. Note as with the other flowcharts more efficient arrangement of steps are possible, these flowcharts are designed to illustrate one embodiment.

Figure 8D:
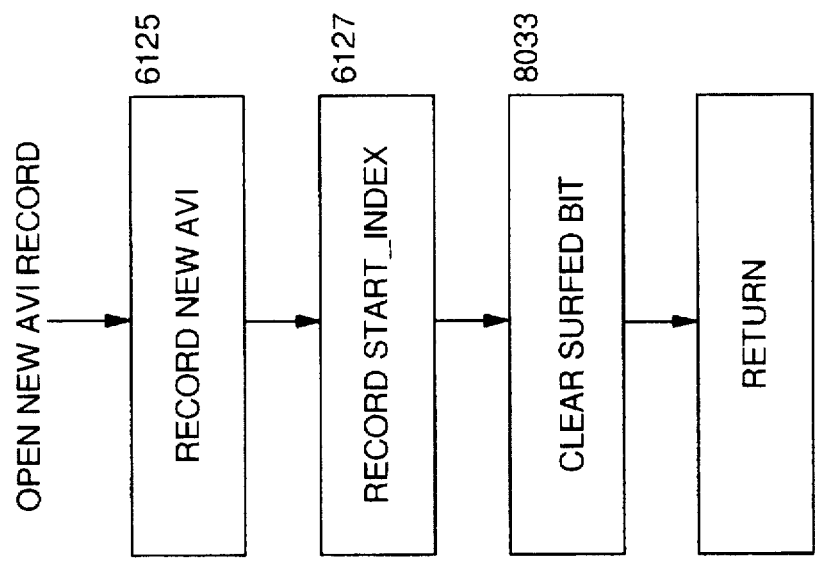
FIG. 8(d) shows the open AVI record procedure with channel surfing filter.
Figure 8E:
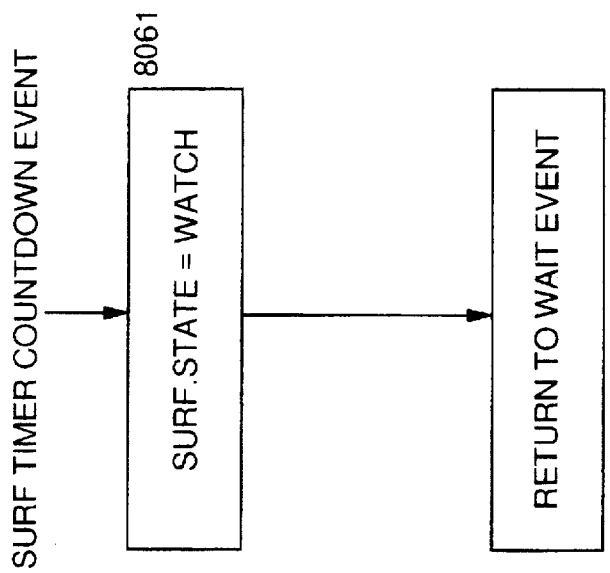
FIG. 8(e) shows the Surf Time Countdown complete event response.

FIG. 8(e) depicts the procedure for handling a surf timer expiration event. In this case the surf timer has expired indicating that the subscriber has not changed channels within the allocated surf interval or within the $T_{SURF}$ time frame. Therefore, the event handler for the surf timer event countdown complete event sets the SURF.STATE=WATCH as shown in step 8061 and control is returned to the main event handler or wait event.

Figure 9:
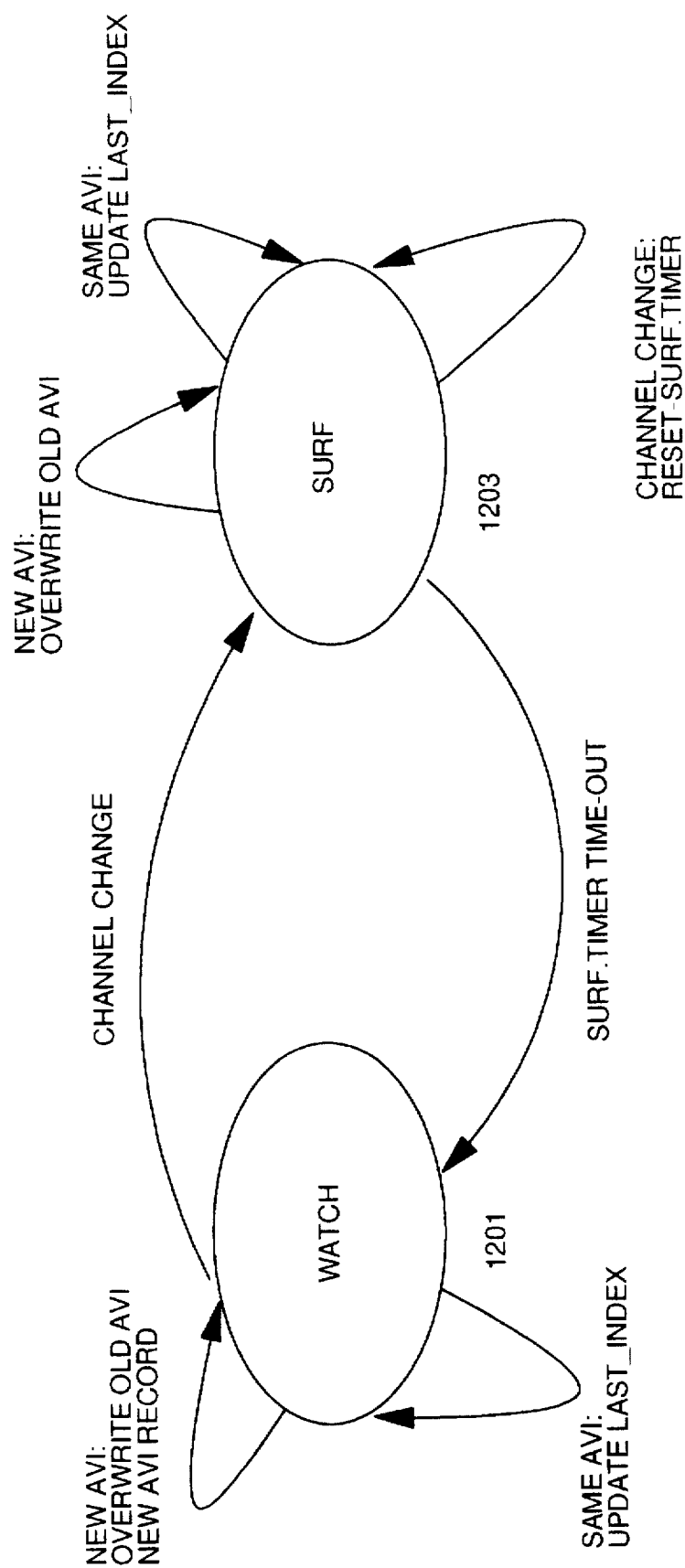
FIG. 9 shows a state diagram for the collection process in a home station.

FIG. 8(d) depicts the procedure involved in opening a new AVI record. Steps 6125 and 6127 are as described for the case without the channel surfing feature. Step 8033 clears the surfed bit in the BCT entry. FIG. 9 depicts a state diagram for the surfing state variable SURF.STATE.

While the invention has been described in detail herein in accord with certain preferred embodiments thereof, modifications and changes therein may be effected by those skilled in the art. Accordingly, it is intended by the appended claims to cover all such modifications and changes as fall within the true spirit and scope of the invention.

What is claimed:

1. A home station having a plurality of channels, each channel receiving an associated audio-visual material stream at least one channel having audio-visual identifier information containing screening classification codes, said home station comprising:

a remote for permitting the subscriber to select a channel for presentation on said home station of an audio-visual material stream and to input subscriber screening information;

a channel classification table for associating channel identifiers with an overall channel classification code;

a screening classification table for associating screening classification codes with audio-visual material manipulation commands;

a decoder for obtaining audio visual identifier information including screening classification codes from the audio-visual materials in a channel selected by the subscriber using the remote;

a screener controller for obtaining an audio-visual material manipulation command from said screening classification table if said screening classification codes are available from said audio-visual material stream in the selected channel, and if said screening classification codes are not available from said selected channel then using a overall classification code obtained from said channel classification table for said selected channel and using said overall classification code to obtain an audio-visual material manipulation command and applying said obtained audio-visual material manipulation command to the audio-visual material stream.

2. The home station of claim 1 wherein channel classification table is obtained by the home station tuning to a predetermined channel and populating the channel classification table.

3. The home station of claim 1 wherein audio-visual material are comprised of an audio portion and a visual portion each portion having its own screening classification codes.

4. The home station of claim 1 wherein the audio-visual material stream is encoded using MPEG and the screening codes are embedded in a transport layer.

5. The home station of claim 1 wherein the screener controller collects the decoded audio-visual identifier Information and the audio-visual material manipulation command in a behavior collection table.

6. The home station in claim 5 further comprising:

a communication manager for sending the collected audio-visual identifier information and audio-visual material manipulation commands onto an upstream channel via a communications adapter.

7. The home station in claim 6 wherein the communication manager sends the collected audio-visual identifier information and audio-visual material manipulation commands in response to a transmit command embedded in audio-visual identifier information.

8. The home station of claim 6 or claim 7 wherein the communications adapter is a cable modem.

9. In a home station having a plurality of channels, each channel receiving an associated audio-visual material stream, with at least one channel having audio-visual identifier containing screening classification codes, said screening classification codes classifying the content of the audio-visual material to be sent in the stream in accordance with a plurality rating classifications, the method of screening audio-visual material comprising the steps of:

receiving an audio-visual material stream from a selected channel;

decoding said audio-visual identifier information including said screening classification codes, if any, from said received audio-visual material stream;

obtaining an audio-visual material manipulation command from a screening classification table if said screening classification codes are available from said audio-visual material stream in the selected channel, and if said screening classification codes are not available from said selected channel then using an overall classification code obtained from a channel classification table for said selected channel and using said overall classification code to obtain an audio-visual material manipulation command; and modifying said received audio-visual material stream in accordance with the obtained audio-visual material modification command.

10. The method of claim 9 further comprising the step of:

presenting the modified received audio-visual material stream on said home station.

11. The method of claim 9 further comprising the step of:

collecting the decoded audio-visual identifier information and the audio-visual material modification command.

12. The method of claim 11 further comprising the step of:

transmitting the collected audio-visual identifier information and audio-visual material modification commands over a upstream channel coupled to the home station.

13. In a home station having a plurality of channels, each channel receiving an associated audio-visual material stream, with at least one channel having audio-visual identifier containing screening classification codes, said screening classification codes classifying the content of the audio-visual material to be sent in the stream in accordance with a plurality rating classifications, the method of screening audio-visual material comprising the steps of selecting a first channel having a first audio-visual material stream containing audio-visual identifier information including screening classification codes;

obtaining a first audio-visual material manipulation command from a channel classification table using a first channel identifier associated with the first channel;

manipulating said first audio-visual material stream in accordance with the first audio-visual material manipulation command;

presenting the manipulated first audio-visual material stream to the subscriber;

decoding said audio-visual identifier information including said screening classification codes from said first audio-visual material stream;

obtaining a second audio-visual material manipulation command from a screening classification table using the decoded screening classification codes;

manipulating said first audio-visual material stream in accordance with the second audio-visual material manipulation command; and, presenting the manipulated first audio-visual material stream to the subscriber.

14. The method of claim 13 including the step of:

collecting the audio-visual identifier information decoded with the selected audio-visual identifier stream and the audio-visual material manipulation commands.

15. An article of manufacture comprising a computer useable medium having a computer readable program embodied in said medium, wherein the computer readable program when executed on a home station causes the home station to:

receive an audio-visual material stream from a selected channel; decode the audio-visual identifier information including said screening classification codes, if any, from said received audio-visual material stream;

obtain an audio-visual material manipulation command from a screening classification table if said screening classification codes are available from said audio-visual material stream in the selected channel, and if said screening classification codes are not available from said selected channel then obtain an overall classification code from a channel classification table for said selected channel and using said overall classification code to obtain an audio-visual material manipulation command;

collect the decoded audio-visual identifier information and the obtained audio-visual material manipulation commands in a behavior collection table;

modifying said received audio-visual material stream in accordance with the obtained audio-visual material modification command; and transmit the behavior collection table.

* * * * *